(12) United States Patent
Rilling

(10) Patent No.: US 7,577,403 B1
(45) Date of Patent: Aug. 18, 2009

(54) NON-CAPTURE ONE-TUNER SMART ANTENNA

(76) Inventor: Kenneth F. Rilling, 1190 Crestline Dr., Cupertino, CA (US) 95014

(*) Notice: Subject to any disclaimer, the term of this patent is extended or adjusted under 35 U.S.C. 154(b) by 242 days.

(21) Appl. No.: 10/959,438

(22) Filed: Oct. 5, 2004

Related U.S. Application Data

(60) Provisional application No. 60/508,935, filed on Oct. 6, 2003, provisional application No. 60/512,138, filed on Oct. 16, 2003, provisional application No. 60/518,954, filed on Nov. 10, 2003.

(51) Int. Cl.
*H04B 1/00* (2006.01)
*H04B 15/00* (2006.01)

(52) U.S. Cl. .............. 455/63.1; 455/272; 455/273; 455/275; 455/276.1

(58) Field of Classification Search ........... 455/63.1, 455/296, 272, 273, 275, 276, 276.1
See application file for complete search history.

(56) References Cited

U.S. PATENT DOCUMENTS

| | | | | |
|---|---|---|---|---|
| 4,752,969 | A | * | 6/1988 | Rilling ............ 455/278.1 |
| 5,940,768 | A | * | 8/1999 | Thro et al. ......... 455/507 |
| 6,087,986 | A | | 7/2000 | Shoki et al. ........ 342/383 |
| 6,115,426 | A | | 9/2000 | Fujimoto et al. ..... 375/260 |
| 6,628,969 | B1 | | 9/2003 | Rilling ............ 455/561 |
| 6,978,125 | B2 | * | 12/2005 | Lindell et al. ...... 455/183.1 |
| 7,248,877 | B2 | * | 7/2007 | Skafidas et al. ..... 455/450 |
| 2002/0045431 | A1 | * | 4/2002 | Bongfeldt .......... 455/234.1 |
| 2004/0116078 | A1 | * | 6/2004 | Rooyen et al. ...... 455/101 |
| 2004/0234012 | A1 | | 11/2004 | Rooyen ............ 375/347 |

OTHER PUBLICATIONS

Widrow, B., et al., Adaptive Antenna systems, Proceedings of the IEEE, vol. 55, No. 12, Dec. 1967, pp. 2143-2159.
Wittneben, A. and Dettmar, U., A Low Cost Noncoherent Receiver with Adaptive Antenna Combining For High Speed Wireless Lans, 47$^{th}$ IEEE Vehicular Technology Conference, 1997, pp. 173-177.
Wittneben, A. and Dettmar, U., *A Low Cost Noncoherent Receiver with Adaptive Antenna Combining For High Speed Wireless LANs*, Vehicular Technology Conference, 1997 IEEE 47$^{th}$, May 4-7, 1997, Pheonix, AZ, vol. 1, pp. 173-177.
Wittneben, A. and Dettmar, U., *On Potential of Adaptive Antenna Combining for Intersymbol Interference Reduction in High Speed Wireless LANs*, Vehicular Technology Conference, 1997 IEEE 47$^{th}$, May 4-7, 1997, Pheonix, AZ, vol. 2, pp. 627-631.

* cited by examiner

*Primary Examiner*—Nay A Maung
*Assistant Examiner*—Tuan H Nguyen
(74) *Attorney, Agent, or Firm*—Allston L. Jones

(57) ABSTRACT

In one-tuner smart antennas, a representation of the antenna element wideband signal is correlated with a representation of the smart antenna output signal to give a measure of the selected channel bandpass power and desired signal power. Since only signals in the selected channel bandpass of the wideband antenna signals can be correlated with signals in the selected channel, the correlator allows only the selected channel bandpass components of the wideband antenna input signal to contribute to the correlator output. This eliminates the influence of adjacent channels/bands signals and prevents capture by strong adjacent signals. As the smart antenna adapts and reduces the selected channel bandpass interference, the measure becomes that of the desired signal power. The present invention reduces the distortion and capture of the antenna branch amplitude limiter for the weight calculation, power detection of the input power and AGC of an antenna element.

13 Claims, 21 Drawing Sheets

From Antenna 10 in Fig. 16

904

915

920

From limiting function 906 in Fig. 16

To One-tuner Smart antenna 902 in Fig. 16

From Antenna 10 in Fig. 16

904'

920'

From limiting function 906 in Fig. 16

915'

To One-tuner Smart Antenna 902 in Fig. 16

NON-CAPTURE ONE-TUNER SMART ANTENNA

CROSS REFERENCES

This application claims priority from U.S. Provisional Applications, Ser. No. 60/508,935 filed Oct. 6, 2003, Ser. No. 60/512,138 filed Oct. 16, 2003 and Ser. No. 60/518,954 filed Nov. 10, 2003.

BACKGROUND OF THE INVENTION

1. Technical Field

The present invention relates to the use of the one-tuner smart antenna in communications receivers and is particularly directed to reducing the degradation and capture effect that can be caused by signals outside of the selected channel bandpass on power detectors, limiters, AGCs and other functions dependent on the power of signals in the selected channel bandwidth.

2. Discussion of the Prior Art

One approach well known in the art for reducing the effects of multipath and other interference is the smart antenna (see for example, Widrow, B. & others, "Adaptive antenna Systems", Proceedings of the IEEE, Vol. 55, No. 12, December 1967, pp. 2143-2159; Monzingo, Robert A. and Miller, Thomas W., *Introduction to Adaptive Antennas*, John Wiley & Sons, New York, and Rappaport, Theodore S. ed., *Smart Antennas, Adaptive Arravs, Algorithms*, & *Wireless Position Location*, IEEE, Piscataway, N.J.). One problem with current smart antennas is that they require a large number of tuner components that occupy space, consume power, generate heat cause inconsistencies from antenna channel to antenna channel and increase costs. This can be a particularly significant problem for physically small and battery powered portable receivers. In many communications systems, the signal environment of the received desired signal includes signals in adjacent frequency channels or adjacent frequency bands. To reduce the interference from adjacent channel and adjacent band signals, bandpass filters or tuning bandpass filters are used to select the frequency channel of the desired signal and reject the adjacent channel and adjacent band signals. Typically for a smart antenna with N antennas, N tuners are used, where a tuner typically includes a bandpass filter (tuning bandpass filter) and a preamplifier. If the smart antenna is implemented at IF (intermediate frequency), each tuner includes a mixer to down convert the RF (radio frequency) signals to IF. Reducing the number of tuners required by the smart antenna increases the value of the smart antenna in solving a receiver interference problem, particularly in physically small and battery powered portable receivers. Reducing the number of tuners also reduces the inconsistencies from antenna channel to antenna channel. U.S. Pat. No. 6,628,969 by Kenneth Rilling addressed these problems and is incorporated by reference.

But the one-tuner smart antennas like those in U.S. Pat. No. 6,628,969 can have a distortion and capture limitation for limiters, detectors, AGC's and other functions in the wideband signal paths that depend on the power level of the signals in the selected channel bandpass. Many smart antennas include an amplitude limiter means in the antenna branch input to the weight calculation correlators to improve performance. Since the antenna element bandpass filter is no longer used, adjacent channels/bands signals that are much stronger than the desired signal can capture the gain of limiters in the antenna input signals paths. The gain of the limiter changes with the change in power of the much stronger adjacent channel/band signal(s), giving the signals of selected channel very little control over the limiter gain. This can cause reduced performance of the smart antenna.

Similarly, power detectors for determining the selected channel input power levels of this one-tuner smart antenna elements are made inaccurate by strong adjacent channels/bands signals. Also, AGC functions at the one-tuner smart antenna front end can be made to perform poorly or be captured by strong adjacent channels/bands signals. Any function that uses the selected channel or desired signal power that is dependent on the bandpass filtering in the antenna element signal path of a standard N-tuner smart antenna is either captured, made inoperable or degraded by the strong adjacent channels/bands signals in a one-tuner smart antenna.

SUMMARY OF INVENTION

An object of the present invention is to reduce distortion and the capture effect that signals outside the selected channel have on functions applied to wideband signals of the one-tuner smart antenna and other systems.

Another object of the present invention is to reduce distortion and the capture effect that signals outside the selected channel have on detectors measuring the power of the selected channel or desired signal in the wideband antenna signal and other wideband signals of a one-tuner smart antenna.

Another object of the present invention is to reduce the distortion and capture effect on AGC functions for signals in the selected channel bandpass applied to the wideband antenna signals and other wideband signals of the one-tuner smart antenna by adjacent channels/bands signals.

Another object of the present invention is to reduce distortion and the capture effect that signals outside the selected channel have on amplitude limiters applied to the wideband antenna signal inputs of the weight calculation correlators and other wideband signals of a one-tuner smart.

Another object of the present invention is to reduce the distortion and capture effect that signals outside the selected channel have on signal processing functions, such as, AGC, power detector, etc. with the bandpass filter for the selected channel removed.

The present invention reduces the distortion and capture effect caused by very strong adjacent channel and adjacent band signals on functions applied to wideband signals of one-tuner smart antennas that use the power of the selected channel bandwidth.

A constant amplitude representation of the antenna element wideband signal is correlated with a representation of the smart antenna output signal, to give a measure of the selected channel bandpass power and desired signal power. Since only signals in the selected channel bandpass of the wideband antenna signals can be correlated with signals in the selected channel, the correlator allows only the selected channel bandpass components of the wideband antenna input signal to contribute to the correlator output. This eliminates the influence of adjacent channels/bands signals and prevents capture by strong adjacent signals. As the smart antenna adapts and reduces the selected channel bandpass interference, the measure becomes that of the desired signal power. The selected channel power level or the desired signal power level can be selected as appropriate for the application.

One embodiment of the present invention reduces distortion and capture of the antenna branch amplitude limiter for the first correlator of the associated weight calculation. The associated wideband antenna branch input signal is coupled as the first input to a second correlator. The output of the one-tuner smart antenna is coupled to the second input of the second correlator. The correlator generates the control signal for an associated gain network. The correlator allows only the selected channel bandpass components of the wideband antenna input signal to contribute to the control signal, thus eliminating the influence of the strong adjacent channels/bands signals which prevents gain distortion preventing and capture. The gain of the non-capture limiter is controlled by signals in the selected channel.

Another embodiment of the present invention is a non-capture detector. The non-capture detector reduces distortion and the capture effect of power detector used to determine the input power of an antenna element of a one-tuner smart antenna. The associated wideband antenna branch input signal is coupled to the first input of a third correlator. A representation of the output of the smart antenna is the second input to the third correlator. The third correlator output signal is detected by a detector and is scaled to the appropriate value to represent the selected channel power and/or desired signal power level. The third correlator allows only components in the selected channel bandpass of the wideband antenna input to contribute to the control signal, eliminating the influence of the strong adjacent channels/bands signals and preventing capture.

Another embodiment of the present invention reduces distortion and the capture effect on an AGC function applied to a wideband signal of a one-tuner smart antenna caused by signals in the adjacent channels and adjacent bands. The wideband signal is coupled to the first input of a non-capture detector. The output of the smart antenna is the second input to the non-capture detector. The non-capture detector generates an output signal that is scaled to the appropriate value to represent the selected channel power or desired signal power and is fed (in feedback or feed forward as appropriate) to a gain control. The correlator of the non-capture detector allows only components in the selected channel bandpass of the wideband antenna input signal to contribute to the control signal for adjusting the gain of the gain control, thus eliminating the influence of adjacent channels/bands signals and preventing capture.

The present invention reduces the distortion and capture effect in other communications signal flows with bandpass filters removal which causes degradation or capture of detector, AGC, limiter or other functions that used the signal power of selected channel by signals outside the selected channel bandpass.

DETAILED DESCRIPTION OF THE PRESENT INVENTION

Figure 1:
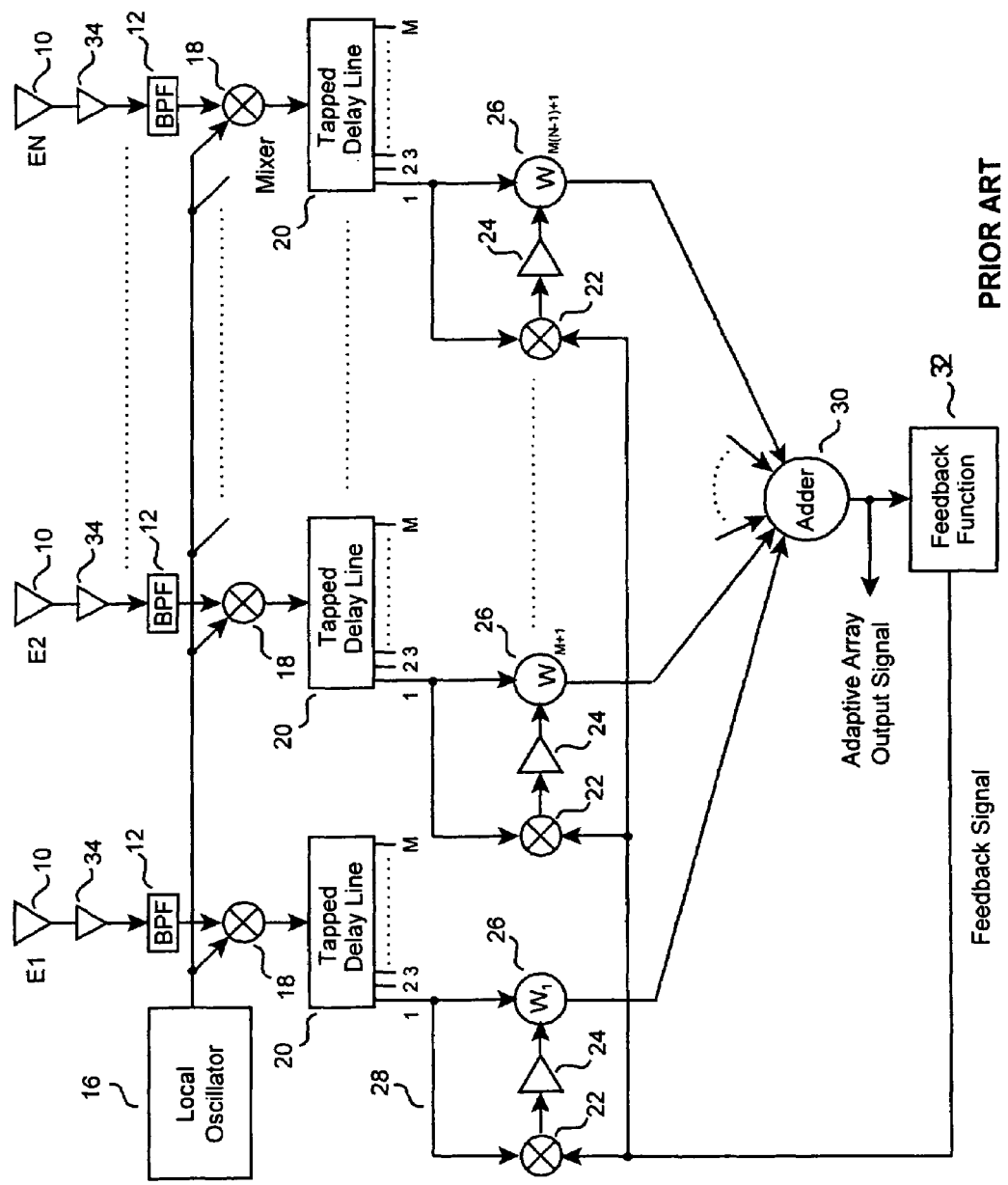
FIG. 1 is a block diagram of a prior art smart antenna.

Typically, communications receiving systems using a smart antenna include a tuner for each antenna element of the smart antenna. FIG. 1 shows a typical prior art smart antenna for a receiver in a communications system with other signals present in the adjacent frequency channels of the system or adjacent frequency bands. The RF signals are received by each of the N antennas 10. Each one of the N preamplifiers 34 accept the output signal of the associated antenna and amplifies the received signal. The output signal of each preamplifier 34 is coupled to the input of the associated one of N bandpass filters 12 to reject signals outside the selected channel bandpass. The output signal of each bandpass filter 12 is coupled to the input of the associated mixer 18. Using the signal from local oscillator 16 as a second input, each the N mixers 18 down converts the bandpass filter output signal to IF. The combination of the associated pre-amplifier 34, bandpass filter 12, and mixer 18 each constitute a tuner. FIG. 1 has N tuners, one for each antenna 10. The output signal of each mixer 18 is coupled to the input of an associated tapped delay line 20, which generates M output signals. Each of the output signals of each tapped delay line 20 is coupled to the first input terminal of associated weight 26 that weights the signal. The output signal of each weight 26 is coupled to an associated input of adder 30 which sums the weighted signals. The output signal of adder 30 is coupled to the input of feedback function 32, which generates the feedback signal. The feedback signal is coupled to the second input of each multiplier 22. The first input of each multiplier 22 is coupled to the associated output signal of the associated delay line 20. Each multiplier 22 multiplies the associated output signal of the associated delay line 20 with the feedback signal. The output signal of each multiplier 22 is coupled to the input of an associated integrator 24, which generates the weighting signal. The output signal of each integrator 24 is coupled to the second input terminal of the associated weight 26 to provide the weighting value. Each multiplier 22 and the associated integrator 24 form a correlator. The output signal of adder 30 is the smart antenna output signal.

In the present patent application, "channel" is defined as the frequencies occupied by a specific radio communications or broadcast signal when transmitted. Generally, this predefines the system design. Often a communications or broadcast system has a number of channels that are at adjacent frequencies from which a channel is selected for the desired signal. The selected channel bandpass is defined as the bandwidth of the selected channel at the channel frequency.

The term "smart antenna" is used for antenna arrays that automatically adapt weights to reduce interference (including multipath) and improve signal quality (i.e. adaptive antennas, adaptive arrays, multiple in multiple out adaptive antenna systems, etc.)

In FIG. 1, the signal received by each antenna is bandpass filtered so that the signals in the selected channel bandpass are weighted. The signals outside the selected channel bandpass are rejected. Without bandpass filters 12, the signals outside the selected channel bandpass enter the smart antenna and are seen by the smart antenna as interference signals which the smart antenna will try to reject.

In FIG. 1, the first input signal to each multiplier 22 is from the associated delay line 20 output, having, nominally, the same bandwidth as bandpass filter 12. The second input signal of each multiplier 22 is the feedback signal, which also, has nominally, the same bandwidth as the bandpass filter 12 (assumes that the feedback function is linear). Each multiplier 22 multiplies the associated input signals. The uncorrelated components produce products that are integrated to zero by the associated integrator 24 and do not contribute to the value of the associated weight. The correlated components, in general, integrate to non-zero values and produce the weight value that is applied to the associated weight 26. The smart antenna converges to a set of values for weights 26 that reduce the undesired interference signal(s) inside the selected channel bandpass to enhance reception of the desired signal.

Reducing the number of tuners in a smart antenna (or computational load if the tuner can be implemented in digital and a DSP) is very advantageous, because it reduces the component count, improves reliability, reduces space requirements, reduces power consumption, reduces heat generation, and reduces antenna channel to antenna channel differences in the smart antenna. Reducing antenna channel to antenna channel differences improves the performance of the smart antenna and receiver. Reducing the number of tuners is particularly advantageous in receivers that are physically small because they have limited space. In the case of battery powered units, power consumption is reduced.

Figure 2:
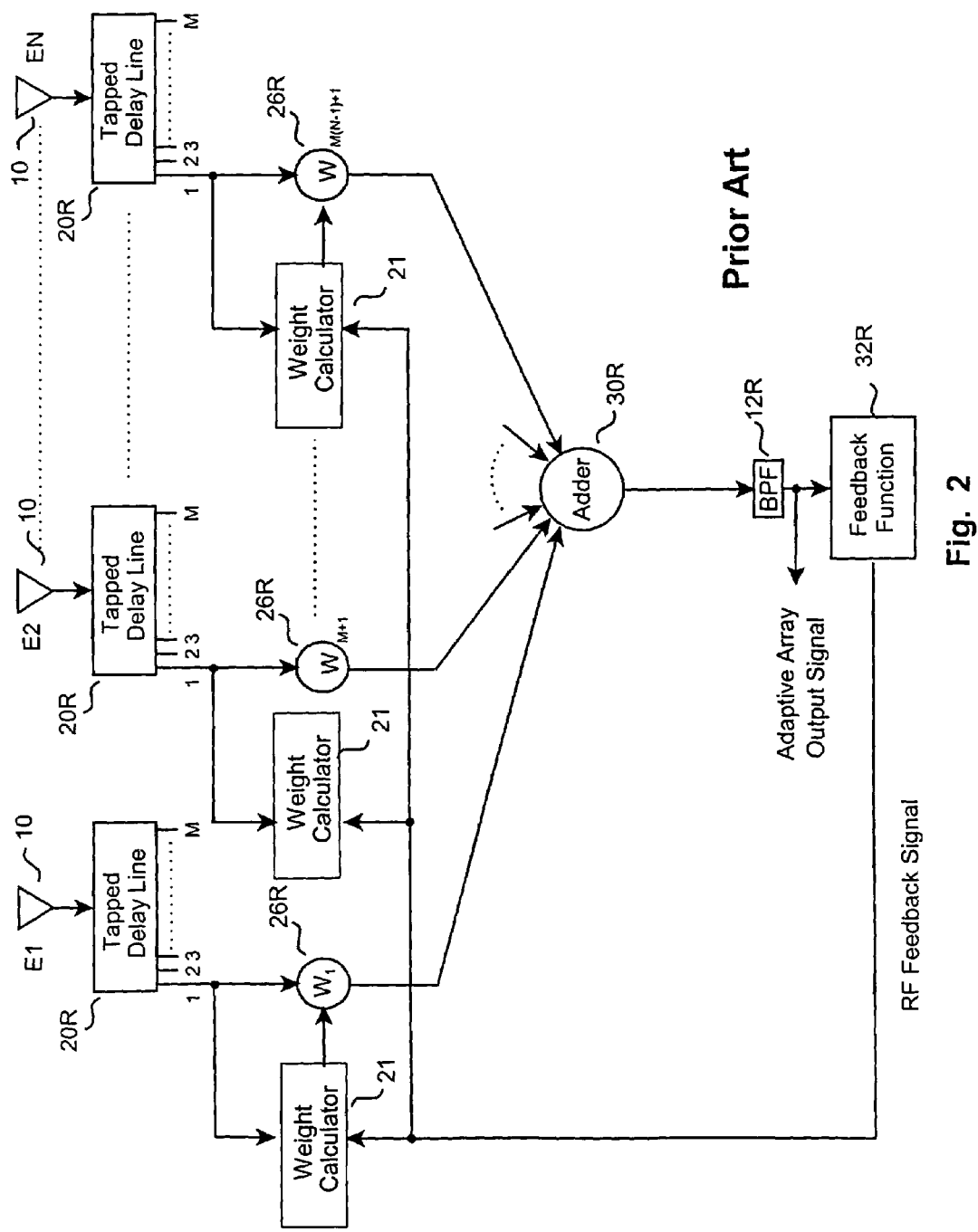
FIG. 2 shows a prior art block diagram of a one-tuner RF smart antenna.

FIG. 2 shows a prior art one-tuner smart antenna. The signals over the full frequency band of the N antennas elements contain the desired signal and other signals in the selected channel bandpass, adjacent channels and adjacent bands. The output terminal of each antenna element 10 is coupled to the input terminal of the associated tapped delay line 20R. Tapped delay line 20R can be replaced by an equivalent phase shifter, such as a 90 degree hybrid. Each tapped delay line 20R generates M time shifted signals of the associated antenna signal. Each output terminal of each tapped delay line 20R is coupled to the first input terminal of the associated weight calculator 21 and first input terminal of associated weight 26R. The weight calculator 21 generates the weighting signal and is discussed below. The output terminal of calculator weight 21 is coupled to the second input terminal of the associated weight 26R to weight the associated output antenna signal from the tapped delay line 20R. The output terminal of each weight 26R is coupled to an associated input terminal of adder 30R to sum all the weighted signals. The output terminal of adder 30R is coupled to the input terminal of bandpass filter 12R to reject all signals not in the selected channel bandpass. The output signal of bandpass filter 12R is the smart antenna output signal. The output terminal of bandpass filter 12R is coupled to the input terminal of feedback function 32R to generate the RF feedback signal. Feedback function 32R is discussed below. The output terminal of feedback function 32R is coupled to the second input terminal of each weight calculator 21 to generate the various weight value signals.

The smart antenna in FIG. 2 weights the received signals over the resulting effective bandwidth of the antennas 10 and tapped delay lines 20R. The weighted frequency components of all the signals are summed by adder 30R. Bandpass filter 12R removes signals outside the bandpass of the selected channel to generate the smart antenna output signal. The smart antenna output signal that is applied to feedback function 32R has the bandwidth and frequencies of bandpass filter 12R and the selected channel. The feedback signal applied to each weight calculator 21 has nominally, the bandwidth and frequencies of bandpass filter 12R. The second input terminal of the associated weight 26R receives the weight value signal from the output terminal of the associated weight calculator 21.

Figure 3:
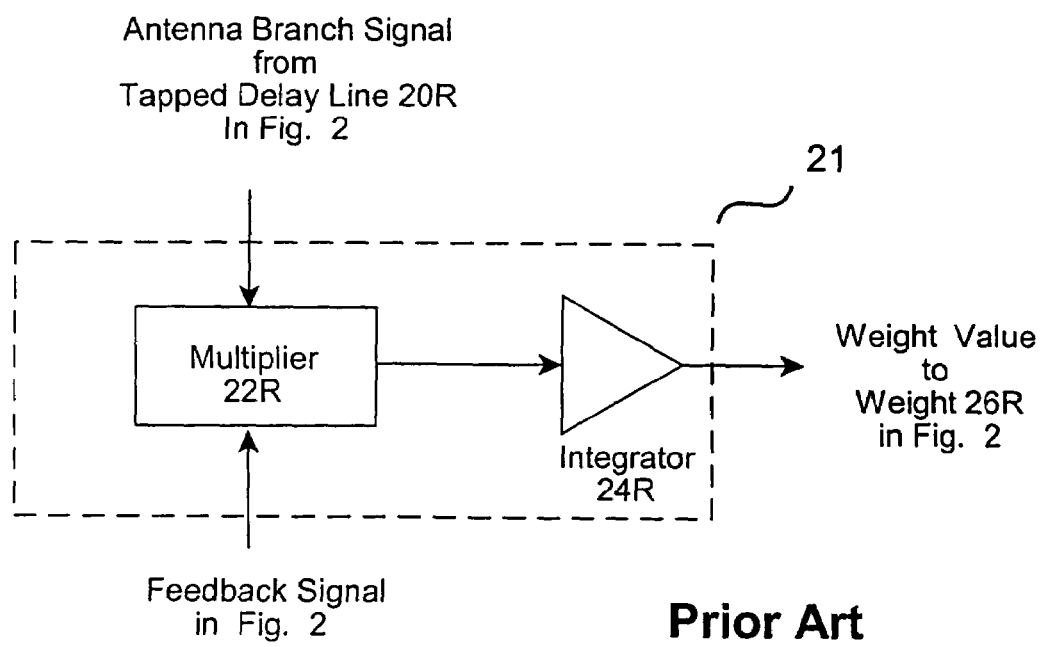
FIG. 3 shows a prior art block diagram of a weight calculator of FIG. 2.

Each weight calculator 21 includes a correlator (correlators are discussed below). FIG. 3 shows one type of prior art correlator that includes multiplier 22R and integrator 24R. The antenna branch signal is applied to the first input terminal of multiplier 22R, and the feedback signal is applied to second input terminal of multiplier 22R. The output terminal of multiplier 22R is coupled to the input terminal of integrator 24R. The output signal of the integrator 24R is the weight value and output signal for some implementations of weight calculator 21. Multiplier 22R multiplies the two input signals, and integrator 24R integrates the resultant multiplied signal from multiplier 22R. Uncorrelated components of the two input signals integrate to zero. Correlated components of the two input signals, in general, integrate to non zero values.

Correlators are well known in the art. They can be implemented in both analog and digital form. Information on correlators can be found in the literature, including smart antenna literature, smart filter literature, matched filter literature and in *Correlation Techniques* by Habil F. H. Lange, Iliffe Bookd Ltd, London and D. Van Nostrand, company, Inc., Princeton N.J., 1967.

In the present invention, the correlator can include a tracking function that keeps the relative phase of the two input signals near optimal value in the event that one of the signals drifts or changes too much, as appropriate.

In FIG. 2, the wideband signal from the antenna input branch and the feedback signal are correlated by weight calculator 21. Frequency components of the wideband signal that are in the bandpass of the selected channel can be correlated with the feedback signal. In general, correlated components contribute to the weight value. Uncorrelated components do not contribute to the weight value.

The smart antenna converges to the desired weight values to reduce interference, such as multipath, cochannel, or adjacent channel, in the selected channel bandpass in a manner similar to the smart antenna's N tuner counter part in FIG. 1. The smart antenna in FIG. 2 ignores the signals in the adjacent channels and adjacent bands. The bandpass filter 12R rejects the signals in the adjacent channels and adjacent bands. As a result, signals outside the selected channel bandpass are not in the smart antenna output signal. The smart antenna output signal is in the bandpass of the selected channel.

In the FIG. 2, signals outside the selected channel bandpass enter the smart antenna. By making the bandwidth of the feedback signal that is applied to the correlators of weight calculators 21 the same as the selected channel bandpass, the correlation of the feedback signal with the antenna branch wideband signal containing adjacent channel or adjacent band signals produces cross terms that are uncorrelated and integrate to zero in the correlator, thus, not affecting the weight calculation. Signals within the selected channel bandpass can be correlated with the feedback signal and produce non-zero values that contribute to the weight value. In the FIG. 2, the degrees of freedom of the smart antenna are used to reject interference signals in the selected channel bandpass.

All tuner components inject some phase and amplitude error. The more components that are used, the greater are the number of errors that are injected. These errors cause the performance of the smart antenna to degrade. Because there are fewer component inconsistencies antenna channel to antenna channel, the smart antenna of FIG. 2 performs better.

Alternatively, the smart antenna can be implemented with the antenna branch input signals being bandpass filtered by associated bandpass filter, and with the shown bandpass filter 12R removed from the output signal path of the smart antenna. In this alternative implementation, the feedback signal contains all the signals outside the selected channel bandpass.

A pre-amplifier can be added for better signal to noise. A pre-amplifier can added in series in front of bandpass filter 12R in FIG. 2. Alternatively, a separate pre-amplifier can be added in series after each antenna element (E1 to EN) in FIG. 2. For IF down conversion, a mixer can be added at the smart antenna output terminal.

The prior art smart antenna in FIG. 2 has fewer tuner components than the prior art smart antenna in FIG. 1. The smart antenna in FIG. 2 has N−1 fewer bandpass filters 12 and N−1 fewer preamplifiers 34 (when used) than a standard smart antenna implementation, as shown in FIG. 1. The one-tuner smart antenna in FIG. 2 can be applied to direct down conversion receivers. In an IF smart antenna implementation, the smart antenna of FIG. 2 has N−1 fewer mixers 18 than a standard IF smart antenna.

In FIG. 2, the feedback function 32R, which generates the feedback signal for calculating the weights, can be any appropriate function matched to weight calculators 21 which together are defined by the type of smart antenna, such as constant modulus algorithm, least means square (LMS), etc. For example, when the desired signal modulation has a constant modulus, weight calculator 21 can be the correlator in FIG. 3 with the feedback function 32R being an amplitude limiter (see Rilling U.S. Pat. No. 4,797,950 above). For a least means square (LMS) smart antenna when a reference signal is available, each weight calculator 21 consists of the correlator in FIG. 3 and the feedback function 32R which subtracts the reference signal from the smart antenna output signal to generate the feedback signal (see Widrow above).

The embodiment of the present invention in FIG. 2 shows only one family of smart antennas. It will be clear to those skilled in the art that the present invention applies to other types of smart antennas in signal environments with signals outside the selected channel bandpass.

Figure 4:
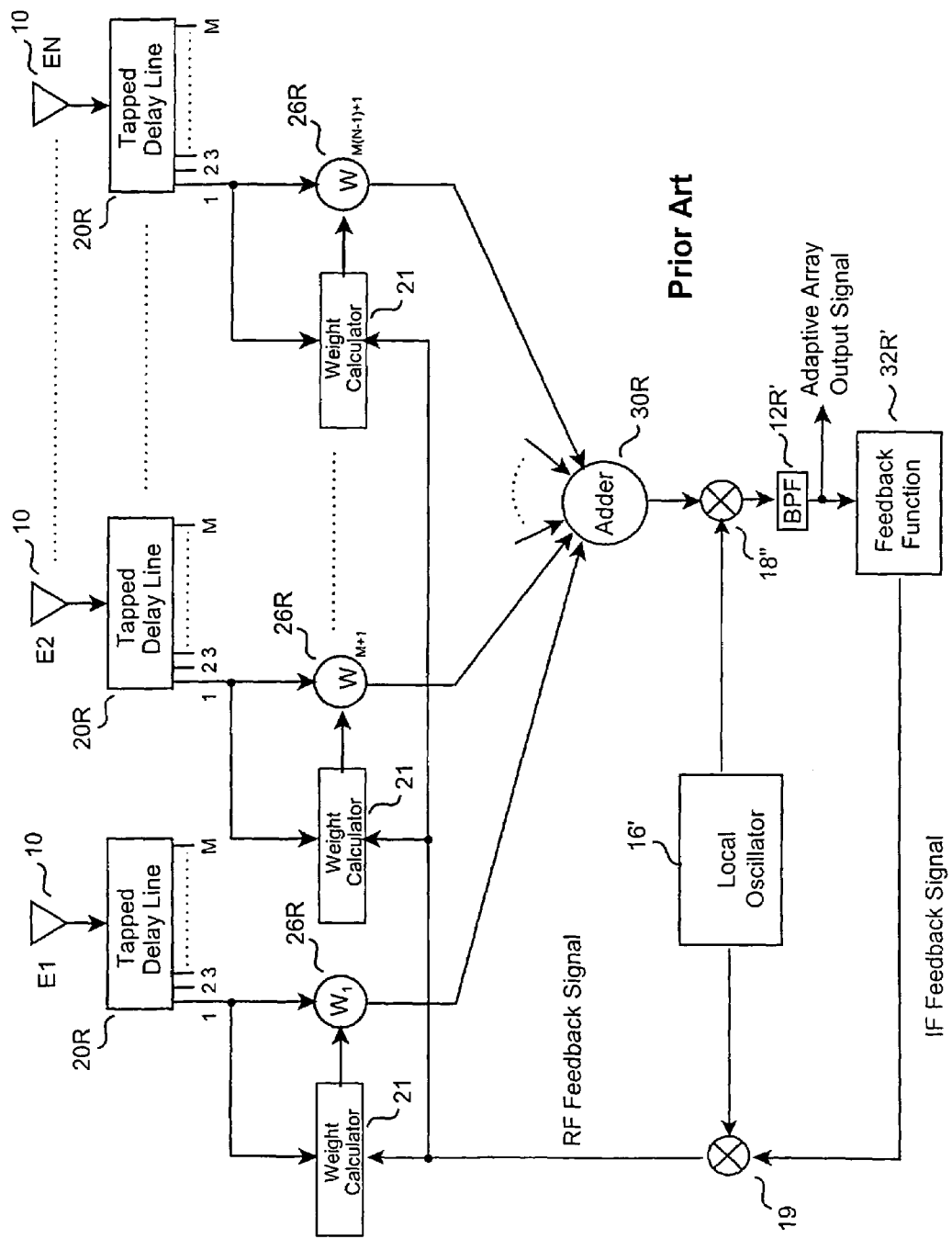
FIG. 4 shows a prior art block diagram of a one-tuner smart antenna with an IF feedback function.

FIG. 4 shows another prior art one-tuner smart antenna. The signals over the full frequency band of the N antennas elements contain the desired signal and other signals in the selected channel bandpass, adjacent channels and adjacent bands. The output terminal of each antenna element 10 is coupled to the input terminal of the associated tapped delay line 20R. Tapped delay line 20R can be replaced by an equivalent phase shifter, such as a 90 degree hybrid. Each tapped delay line 20R generates M time shifted signals of the associated antenna signal. Each output terminal of each tapped delay line 20R is coupled to the first input terminal of the associated weight calculator 21 and first input terminal of associated weight 26R. The weight calculator 21 generates the weighting signal. The output terminal of calculator weight 21 is coupled to the second input terminal of the associated weight 26R to weight the associated output antenna signal from the tapped delay line 20R. The output terminal of each weight 26R is coupled to an associated input terminal of adder 30R to sum all the weighted signals. The output terminal of adder 30R is coupled to the first input terminal of down converter 18". The output terminal of down converter 18" is coupled to the input terminal of bandpass filter 12R'. The first output terminal of local oscillator 16' is coupled to the second input terminal of down converter 18" to down convert the RF output signal from adder 30R to IF. Bandpass filter 12R' filters out signals outside the IF bandpass of the receiver. Bandpass filter 12R' has a fixed bandpass and is the same for all selected RF channels. The output signal of bandpass filter 12R' is the IF smart antenna output signal. The output terminal of bandpass filter 12R' is coupled to the input terminal of feedback function 32R' to generate an IF feedback signal. The output terminal of feedback function 32R' is coupled to the first input terminal of up converter 19. The second output terminal of local oscillator 16' is coupled to the second input terminal of up converter 19 to up convert the IF feedback signal back to the RF bandpass and frequency of the selected channel, generating the RF feedback signal. The output terminal of the up converter 19 is coupled to the second input terminal of each weight calculator 21.

In FIG. 4, the smart antenna weights the received signals over the resulting effective bandwidth of the antennas 10 and tapped delay lines 20R. The weighted frequency components of all the signals are summed by adder 30R. The output signal from adder 30 is down converted to IF by down converter 18". All selected RF channels are down converted to the same IF. The output signal from down converter 18" is bandpass filtered by bandpass filter 12R' to remove all signals outside the bandpass of the IF. Bandpass filter 12R' removes all down converted RF signals that were outside the bandpass of the selected channel (at RF). The bandpass filter 12R' output signal is coupled to feedback function 32R', which generates the IF feedback signal. The IF feedback signal is up converted back to the frequency and bandpass of the selected channel (at RF) to generate the RF feedback signal. The RF feedback signal has nominally, the bandwidth and frequencies of bandpass filter 12R'. The RF feedback is coupled to each weight calculator 21 and correlated with the associated broadband antenna signal from the associated tapped delay line 20 output. Received signals in the selected channel bandpass can be correlated with signal components of the RF feedback signal. Received signals outside the selected channel bandpass do not correlate with signal components of the RF feedback signal. Correlated signals contribute to the weight values. As a result, the smart antenna uses its degrees of freedom to reject interference signals with frequencies in the selected channel bandpass. It does not treat signals outside the selected channel bandpass as interference signals. Bandpass filter 12R' removes all signals outside the IF bandpass so the smart antenna output signal does not include signals outside the selected channel bandpass.

In FIG. 4, bandpass filter 12R' and feedback function 32R' do not change in frequency when the selected channel and associated bandpass frequencies are changed, making implementation of bandpass filter 12R' and feedback function 32R' simpler to implement in some cases.

Figure 5:
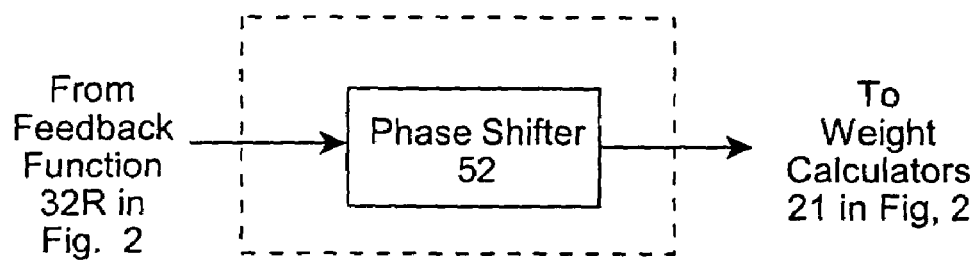
FIG. 5 shows a prior art block diagram of feedback signal phase shifter.

It is often necessary to adjust the phase of the feedback signal to optimize the performance of the smart antenna. FIG. 5 shows a prior art phase shifter 52 that automatically adjusts to the correct phase for each selected channel. The input terminal of phase shifter 52 is coupled to the output terminal of feedback function 32R in FIG. 2, and the output terminal of phase shifter 53 is coupled to each weight calculator 21 in FIG. 2 to shift the phase of the feedback signal to an optimal value for the selected channel.

Similarly, for FIG. 4, the input terminal of a phase shifter 52' is coupled to the output terminal of up converter 19, and the output terminal of phase shifter 52' is coupled to the second input terminal of each weight calculator 21 to shift the phase of the RF feedback signal to an optimal value for the selected channel. Similarly, for FIG. 4 at IF, an IF phase shifter 52" can be implemented serially between bandpass filter 12R' and feedback function 32R' or serially between feedback function 32R' and up converter 19 to shift the phase to an optimal value for each selected channel.

Figure 6:
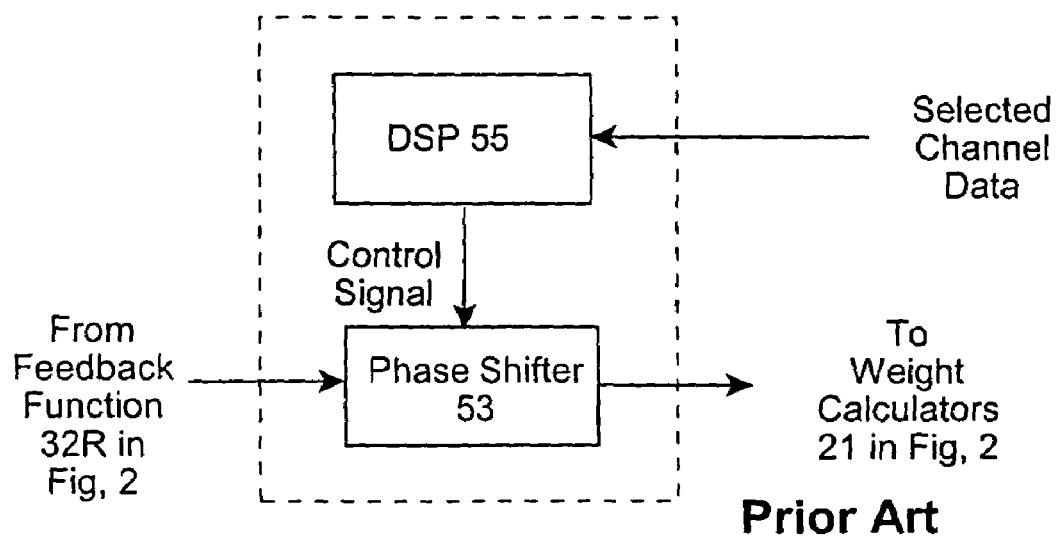
FIG. 6 shows a prior art block diagram of a signal controlled feedback signal phase shift.

FIG. 6 shows a prior art implementation of a phase shifter 52. Here a control voltage is applied to the phase shifter 53 to adjust the phase for the selected channel to the optimal value. A DSP or other electronics can store and generate the proper control signal for each channel. In FIG. 6, DSP 55 receives the selected channel data as an input. DSP 55 computes the optimal phase shift for the selected channel and generates the control signal. The control signal is coupled to the input control signal terminal of phase shifter 53 to adjust the phase.

Figure 7:
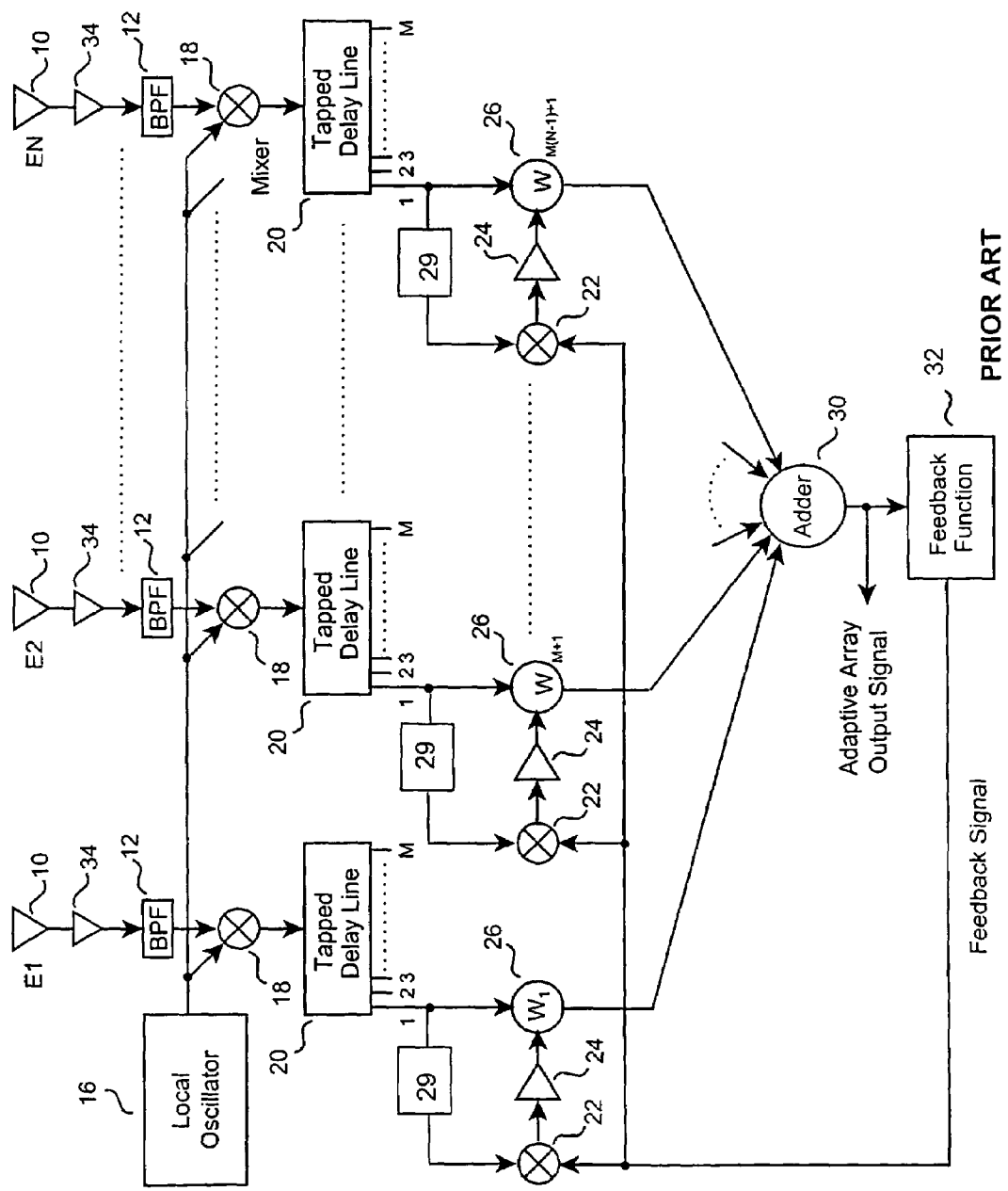
FIG. 7 shows a prior art block diagram of an N-tuner smart antenna with amplitude limiters in the antenna input branch of the correlators.

FIG. 7 shows another prior art N-tuner smart antenna similar to FIG. 1 with the addition of a separate amplitude limiter 29 in each path 28 between the associated output of tapped delay lines 20 and the input of the associated multiplier 22, instead of each output of tapped delay lines 20 being coupled directly to the input of associated multiplier 22. Each amplitude limiter 29 amplitude limits the associated antenna input signal. Amplitude limiters 29 improve the performance of the smart antenna.

Figure 9:
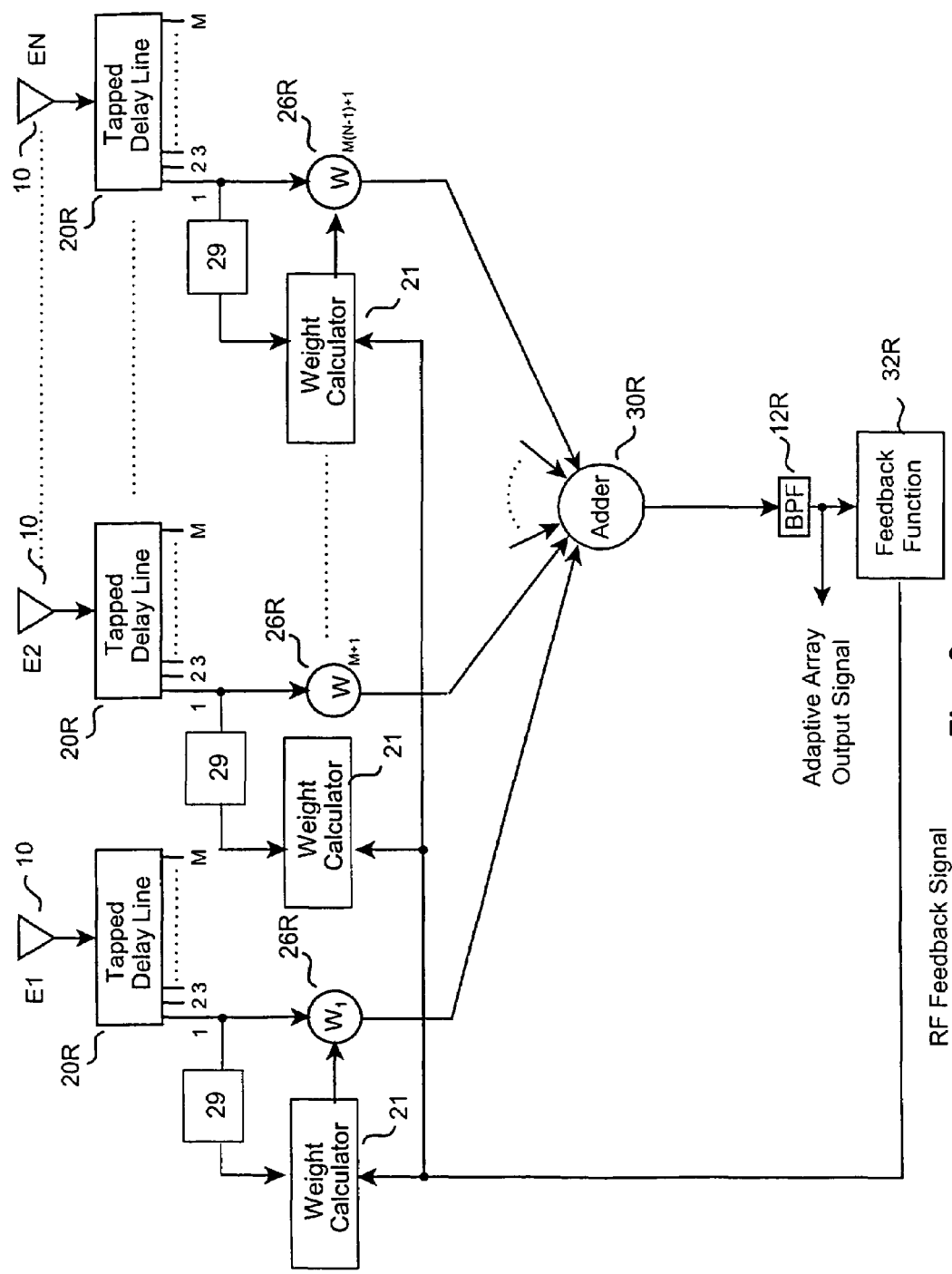
FIG. 9 shows block diagram of the one-tuner smart antenna with a limiter in each antenna input to a weight calculator.

FIG. 9 shows a one-tuner implementation of the present invention that is similar to FIG. 2 except with the addition of a separate amplitude limiter 29 in each path between each output terminal of tapped delay lines 20R and the first input terminal of the associated weight calculator 21, instead of each output terminal of tapped delay lines 20R being coupled directly to the first input terminal of associated weight calculator 21. Each amplitude limiter 29 amplitude limits the associated wideband antenna input signal. The wideband antenna input signals from the tapped delay line 20R can include signals in adjacent channels of the band and adjacent bands (adjacent channels/bands). Some adjacent channel band signals can be very strong. These strong adjacent channels/bands signals can capture and control the gain of limiters 29. When this happens, the power of the signals in the selected channel no longer control the gain of the limiter 29 like it does in its N-tuner smart antenna counter part. The gains of limiters 29 change with the change in power of the adjacent channels/bands signals, changing the performance of the one-tuner smart antenna, in general, in a negative way. For medium strength adjacent channels and bandpass signals, the gains of limiters 29 are distorted. Only for weak adjacent channels/bands signals are the gains of limiters 29 controlled by the signals in the selected channel bandpass. This is a limitation.

Figure 10:
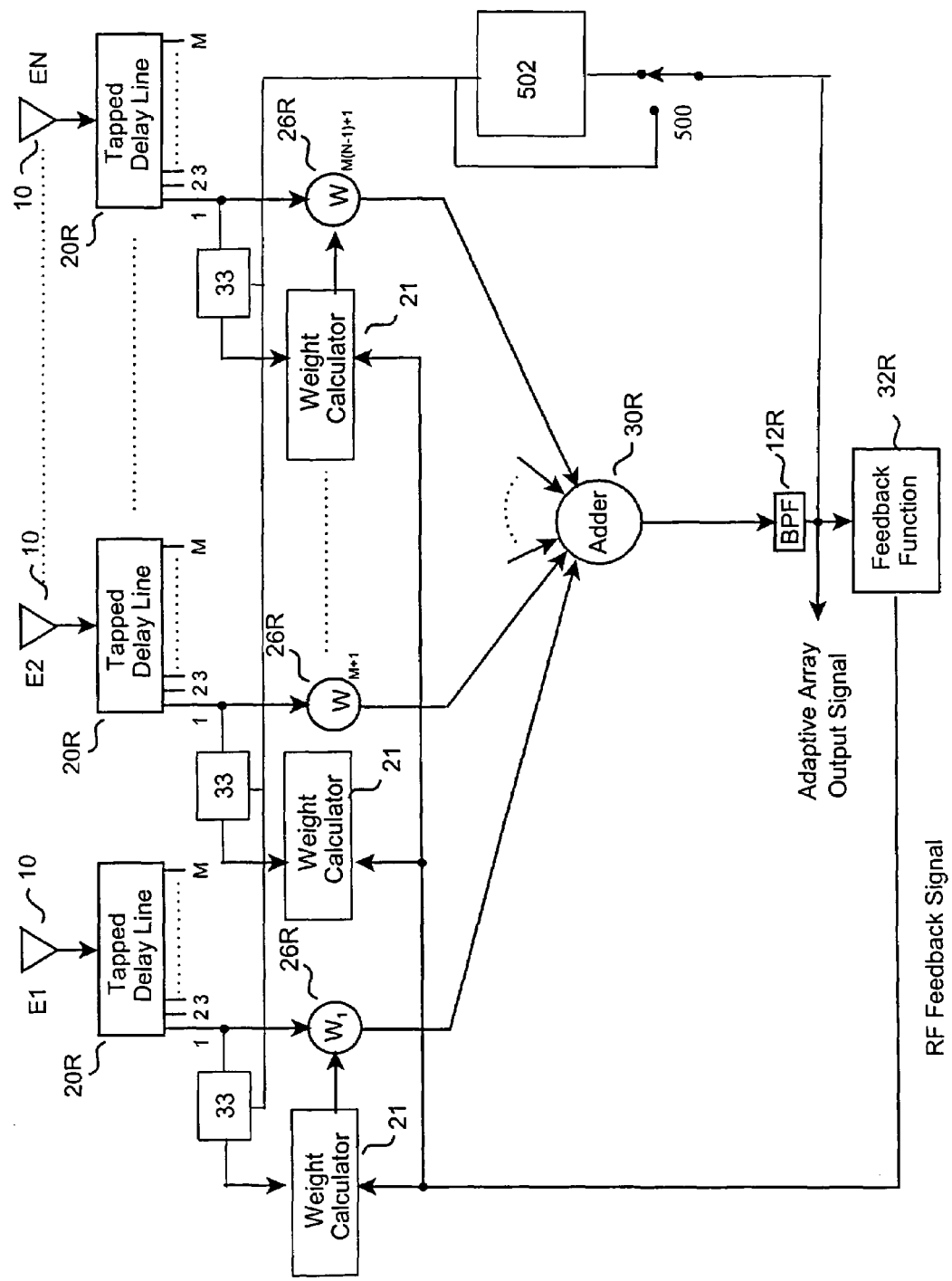
FIG. 10 shows a block diagram of the non-capture limiter of the one-tuner smart antenna of the present invention.

FIG. 10 shows another one-tuner implementation of the present invention that is similar to that shown in FIG. 2. In FIG. 10 each output terminal of tapped delay lines 20R is coupled to the first input terminal of an associated non-capture limiter 33 and the output terminal of non-capture limiter 33 is coupled to the first input terminal of the associated weight calculator 21 in place of the direct connections in FIG. 2 between tapped delay lines 20R and weight calculators 21. Additionally, the output terminal of bandpass filter 12R is also coupled to the common terminal of switch 500 with one selectable output terminal of switch 500 coupled to the input terminal of limiting function 502, plus the output terminal of limiting function 502 and the second selectable output terminal of switch 500 are both coupled to the second input terminal of each of non-capture limiters 33. Non-capture limiter 33 is described below with respect to FIG. 11. Limiting function 502 keeps the power of the signal substantial constant over a desired dynamic range, i.e. limiter, AGC, or other approach.

Figure 11:
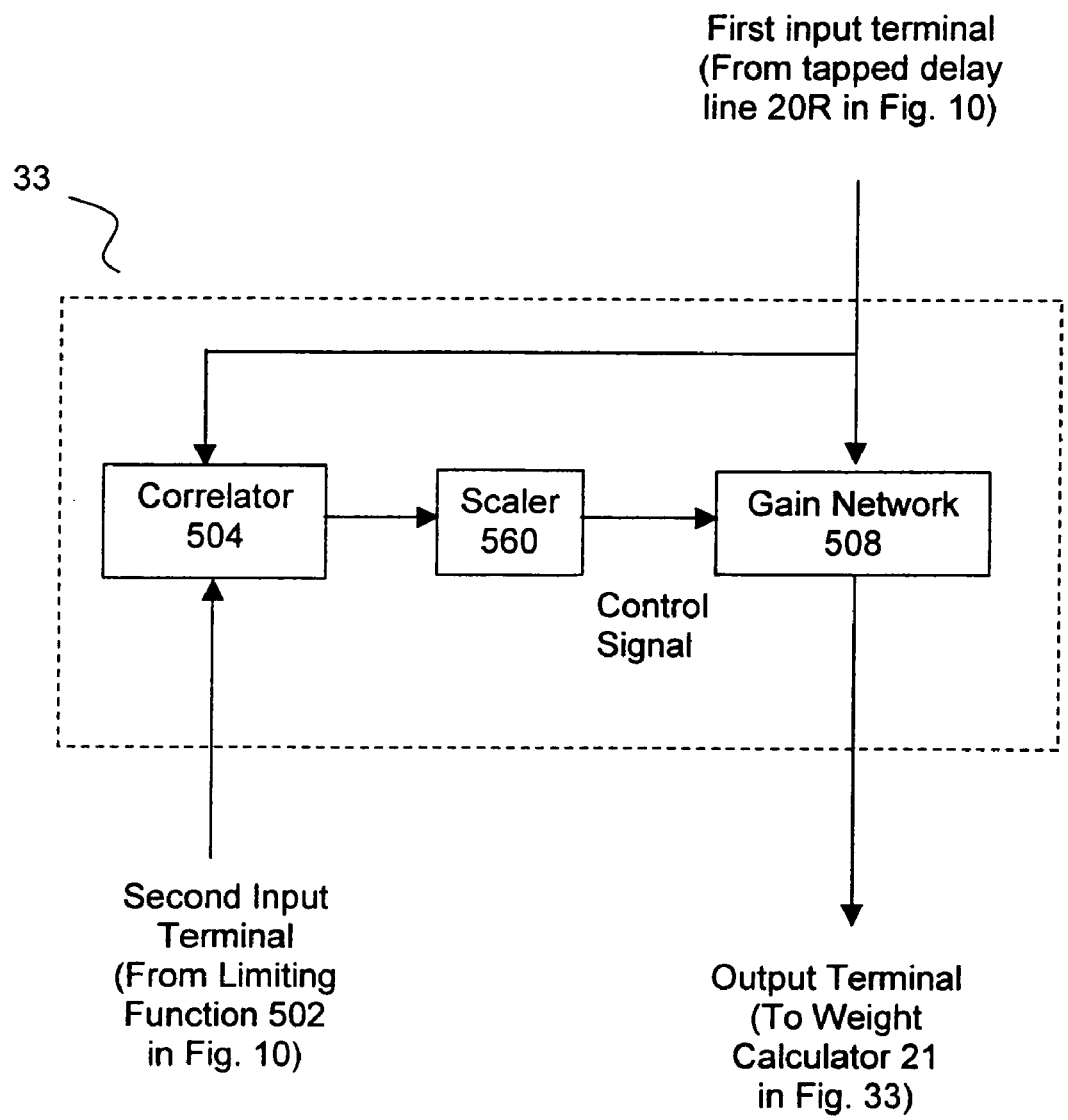
FIG. 11 shows a block diagram of the non-capture limiter in FIG. 10.

FIG. 11 shows one embodiment of non-capture limiter 33 of the present invention. The wideband signal, including the selected channel/desired signal from the associated output terminal of tapped delay line 20R in FIG. 10 is coupled to the first input terminal to non-capture limiter 33, which is connected to both the first input terminal of correlator 504 and the first input terminal of gain network 508. The second input terminal of non-capture limiter 33 is connected to the second input terminal of correlator 504. The output terminal of non-capture limiter 33 is the output terminal of gain network 508, the function of which is discussed below.

Correlator 504 correlates the output signal from limiting function 502, which has the nominal bandpass of the selected channel, and associated wideband antenna signal. The output signal from correlator 504 is coupled to the input terminal of scaler 560. The control signal output from scaler 560 is applied to the second input terminal of gain network 508 to scale the gain of gain network 508 to keep the output signal power level of the selected channel/desired signal constant. Gain network 508 is a variable gain function. Variable gain functions are well known in the art (i.e., variable gain amplifier, amplifier with variable attenuator, etc.). The adjacent channels/bands signals contained in the wideband antenna signal are uncorrelated with the signal components in the selected channel bandpass of the signal from limiting function 502, so they do not contribute to the control signal of the gain network 508. The frequency components of the wideband antenna signal in the selected channel bandpass have components that are correlated with components of the input signal from the limiting function 502 and contribute to the control signal of gain network 508.

Figure 19:
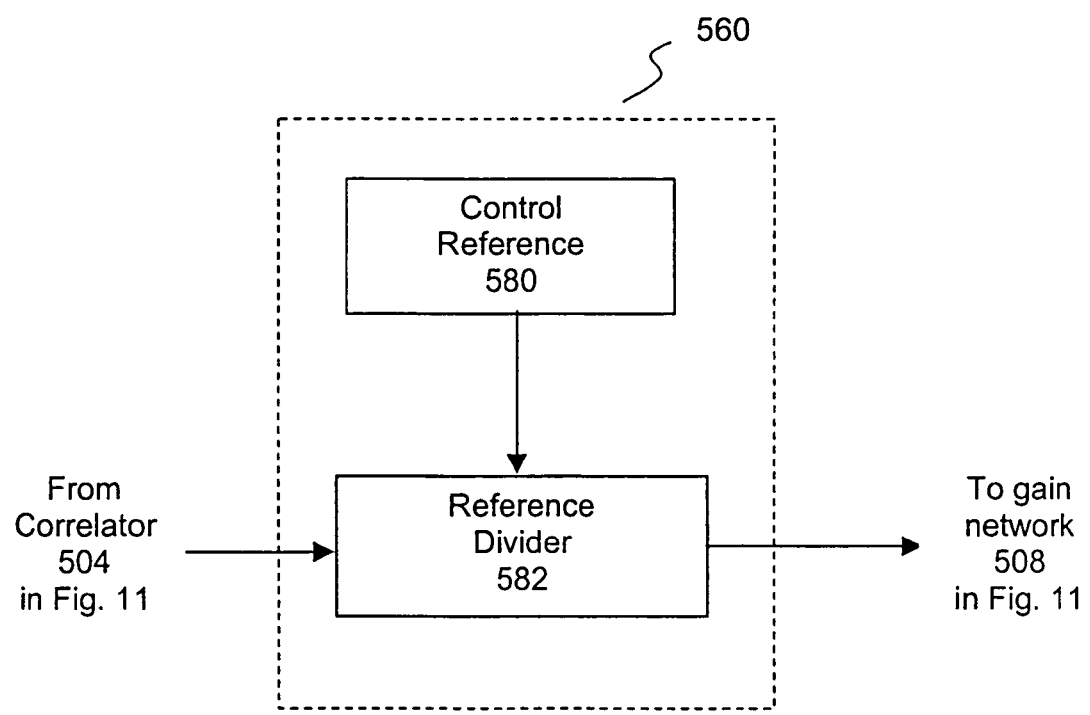
FIG. 19 shows a block diagram of the scaler for the non-capture limiter of FIG. 11.

Referring now to FIG. 19, one embodiment of scaler 560 is shown that includes control reference 580 and reference divider 582. Control reference 580 provides an appropriate constant reference value to reference divider 582 for generating the control signal for gain network 508. The output terminal of control reference 580 is coupled to the first input terminal of reference divider 582. The correlator output signal from correlator 504, in FIG. 11 is coupled to the second input terminal of reference divider 582. The output terminal of reference divider 582 coupled to the control input terminal of gain network 508 in FIG. 11.

Reference divider 582 divides the control reference signal from control reference 580 by the output of the correlator 504 to generate the control signal for gain network 508 in FIG. 11. Since correlator 504 multiplies the signal from limiting function 506 with the signals from the selected channel, an increase in selected channel power increases the correlator 504 output signal in a linear manner. Since reference divider 582 divides the reference control signal by the correlator output signal value, the control signal for gain network 508 decreases proportionately, decreasing the gain of network 508 proportionately. The decrease in the gain of gain network 508 decreases the output level signals of gain network 508 proportionally, keeping the power level of the selected channel or desired signal constant.

This is only one embodiment of the scaler of the present invention. One skilled in the art would recognize that other embodiments are possible.

The present invention embodiment shown in FIG. 10 functions in a manner similar to FIG. 2, with non-capture limiter 33 keeping the power of the selected channel bandpass of the wideband antenna input signal substantially constant. Only the frequency components of the wideband antenna input signal in the selected channel bandpass can contribute to the gain of non-capture limiter 33. The non-capture limiter 33 has the gain based on the power in the selected channel at the start of the smart antenna adaptation. After adaptation, the gain is based on the desired signal power, because the smart antenna has removed the interference in the selected channel and no interference signal components are present in one-tuner smart antenna output signal. In this way the selected channel bandpass signal components of the input wideband antenna signal controls the gain of the limiting function instead of adjacent channels/bands signals. Non-capture limiter 33 mitigates the effects of the adjacent channels/bands signals.

Non-capture limiter 33 in FIG. 10 improves the performance of the one-tuner smart antenna. In the case where a very strong interference signal is located within the selected channel bandpass, the present invention does not allow the strong interference signal to capture the gain of the limiter as in the N-tuner case. This is a an important feature of the present invention.

If the output of a smart antenna does not change much in amplitude, switch 500 in FIG. 10 can be used to bypass limiting function 502 (switch 500 and limiting function 502 can be removed altogether). If the output of a smart antenna changes significantly, switch 500 can engage limiting function 502, and the signal is held constant.

This is only one embodiment of the non-capture limiter of the present invention that has been used to demonstrate the operation of the present invention. It would be clear to one skilled in the art that other embodiments could perform the same function.

If limiting function 502 is non linear, it can have harmonics (i.e., a hard limiter without a zonal filter at the output). These harmonics would not correlate with signals outside the selected channel bandpass because they originate from different sources.

The non-capture limiter 33 can be used in other communications signal flow configurations where a bandpass filter which normally rejects a signal outside the selected channel bandpass is removed and a version of the selected channel bandpass signal is available (i.e., single input adaptive filter).

Figure 12:
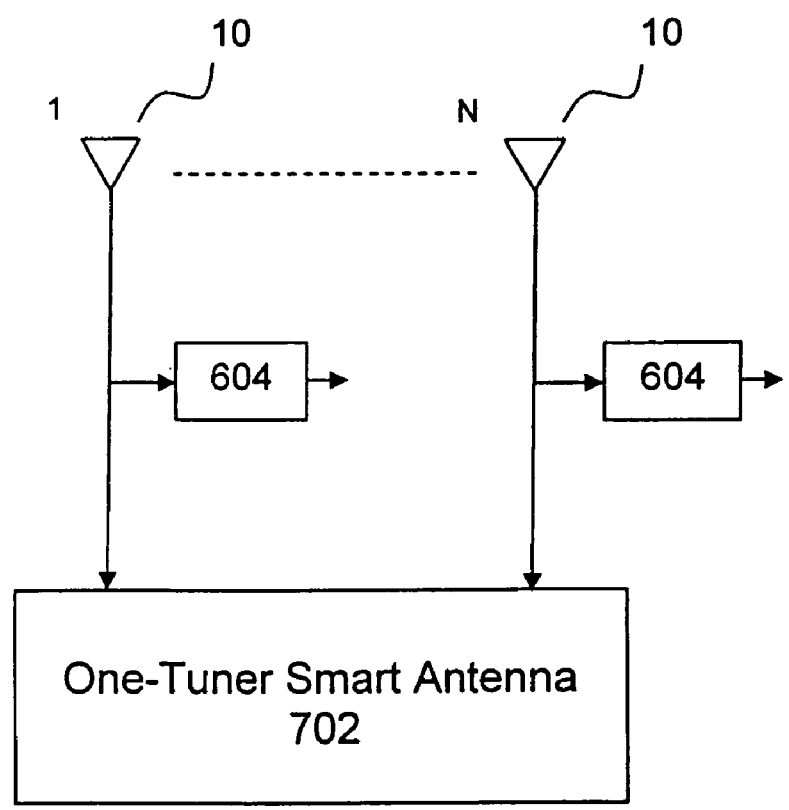
FIG. 12 shows a block diagram of the one-tuner smart antenna with power detectors.

A measure of the input power to the smart antenna is very useful, e.g. for use in the smart antenna algorithm. FIG. 12 shows a one-tuner smart antenna 702 using a standard power detector 604 to measure the input power. Each antenna element 10 is coupled to the input of associated power detector 604 and the associated input of one-tuner smart antenna 702. Power detector 604 detects the power of the complete bandwidth of the associated wideband antenna signal. This prevents the power detector 604 from operating as is required for many applications where the selected channel bandpass input power level is required, because it measures all the signals in all of the bands and allows the measurements of power detector 604 to be distorted and captured by strong signals in the adjacent channels/bands. In most cases, these results are too poor to be useful.

Figure 13:
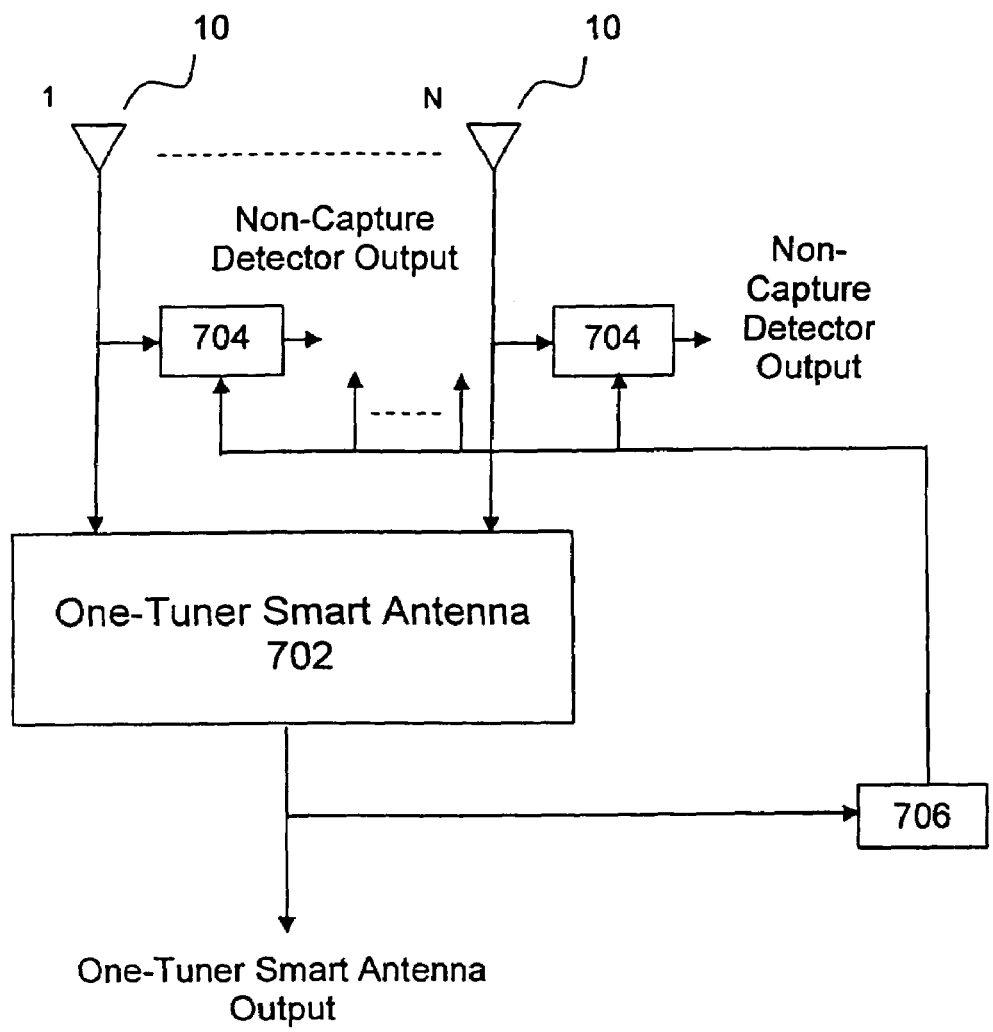
FIG. 13 shows a block diagram of the one-tuner smart antenna with non-capture detectors.

FIG. 13 shows another embodiment of the present invention that solves the distortion and capture problems pointed out in FIG. 12 for input power detection in one-tuner smart antennas. FIG. 13 shows a non capture detector 704 that measures the power in the selected channel of the one-tuner smart antenna 702. Non-capture detectors 704 can not be distorted or captured by signals in the adjacent channels and adjacent bands. Each antenna 10 is coupled to the associated input terminal of one-tuner smart antenna 702 and to the first input terminal of the associated non-capture detector 704. The output terminal of the one-tuner smart antenna 702 is coupled to the input terminal of limiting function 706. Limiting function 706 keeps the power level substantially constant and is similar to limiting function 506 discussed above. The output terminal of limiting function 706 is coupled to the second input terminal of each non-capture detector 704.

Figure 14A:
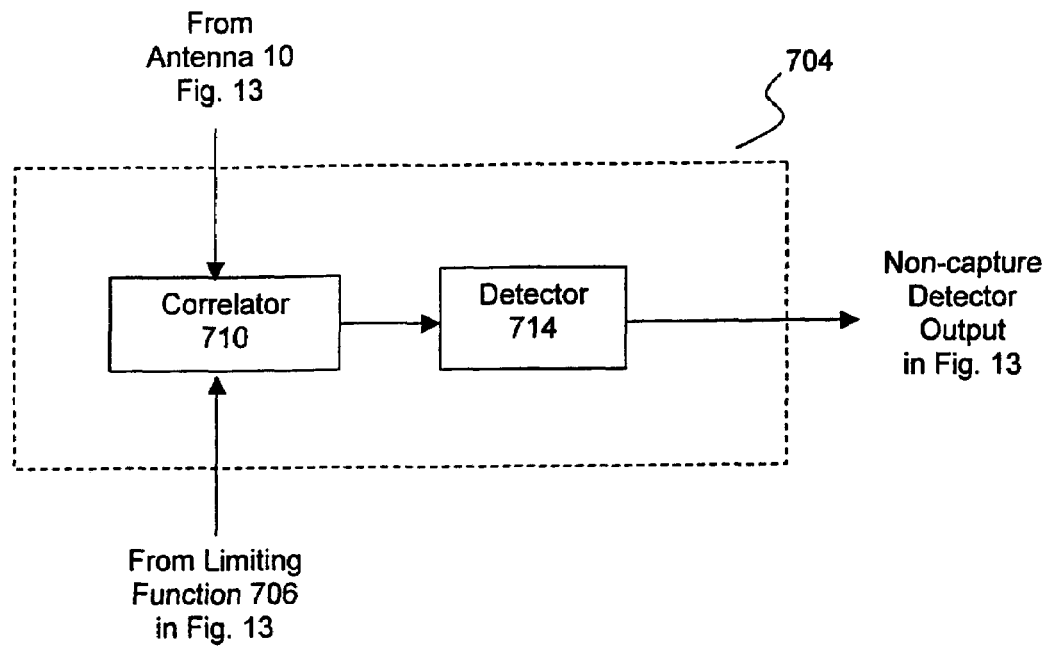
FIG. 14A shows a block diagram of the non-capture detector of FIG. 13.

FIG. 14A shows an embodiment of the non-capture detector 704. The associated antenna 10 is coupled to the first input terminal of correlator 710. The output terminal of limiting function 706 is coupled to the second input terminal of correlator 710. Correlator 710 correlates the output signal from limiting function 706, which has the nominal bandpass The output signal of correlator 710 is coupled to the input terminal of detector 714. Detector 714 detects the signal level of the correlator 710 output signal and scales it to the proper power relationship. The output signal from detector 714 is a representation power level of the frequency components of the antenna signal in the selected channel bandpass at the start of the smart antenna adaptation and of the desired signal after the smart antenna adapts. The output signals of the non-capture detectors for separate antennas can be combined with further signal processing to achieve other purposes, such as, averaging of input signal level over antennas, etc.

Figure 14B:
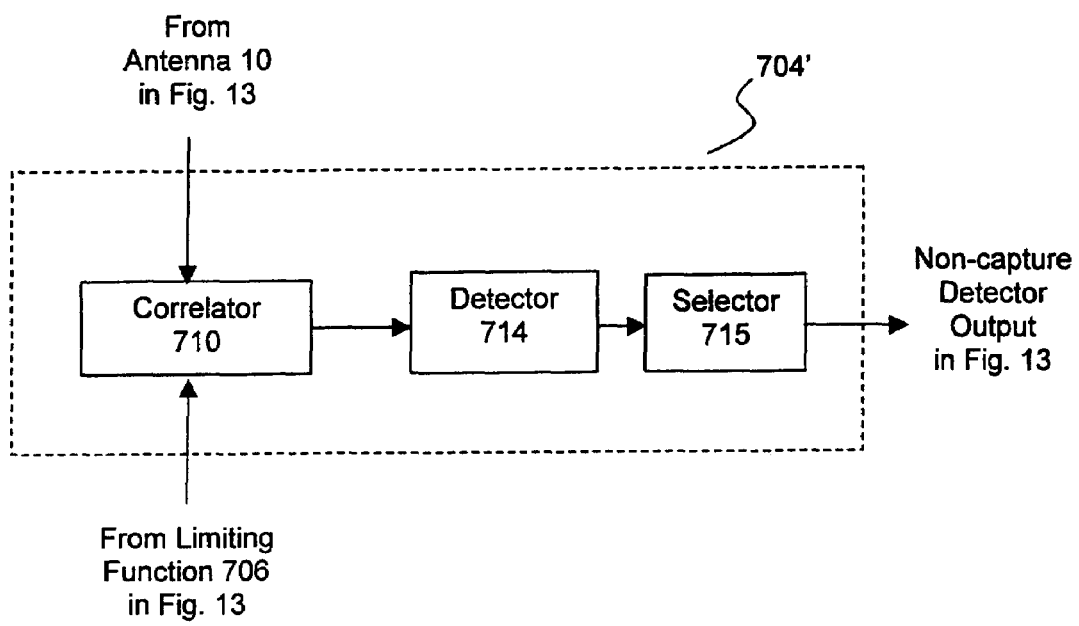
FIG. 14B shows a block diagram of the non-capture detector of FIG. 13 with selector 715.

The non-capture detector 704' in FIG. 14B is similar to the non-capture detector 704 in FIG. 14A, however the output of detector 714 is coupled to selector 715 in FIG. 14B. The output of selector 715 is the non-capture detector output signal in FIG. 13. Selector 715 selects the representation of the signal power level at the beginning of adaptation of the one-tuner smart antenna before the interference signals are reduced and holding this same value over the length of the adaptation to generate the signal power level of all signals in the selected channel bandpass, or selector 715 selects the representation of the signal power level at the end of adaptation of the one-tuner smart antenna after the interference signals are reduced and holding this same value over the duration of next the adaptation to generate the signal power level of the desired signal.

Limiting function 706 keeps the power level substantially constant and is similar to limiting function 506 discussed above. Since the output signal of limiting function 706 has the bandpass of the selected channel and since non-capture detector 704 correlates the output signal of the limiting function 706 with the wideband antenna signal, the adjacent channels/ bands frequency components of the wideband antenna signal that are uncorrelated with the limiting function 706 output signal don't contribute to the correlator output signal or the detected power level. Some or all frequency components of the wideband antenna signal in the selected channel bandpass are correlated with components of the output signal of the limiting function 706 and contribute to the correlator output signal and the detected power level. Since only signal components of the wideband antenna signal in the selected channel bandpass contribute to the correlator output signal and detector power level, the non-capture detector measures only the power of the selected channel bandpass components of the wideband signal at the beginning of the smart antenna adaption, ignoring the adjacent channels/bands signals, and detects only the desired signal level after the smart antenna adapts and rejects interference in the selected channel bandpass. The non-capture detector can be applied to any location within the one-tuner smart antenna where wideband signals are located to detected the signal power.

The non-capture detector 704 can be used in other communications signal flow configurations where a bandpass filter, which normally rejects signals outside the selected channel bandpass, is removed and a version of the selected channel bandpass signal is available.

This is only one embodiment of the present invention. It would be clear to one skilled in the art that other embodiments are possible.

Figure 20:
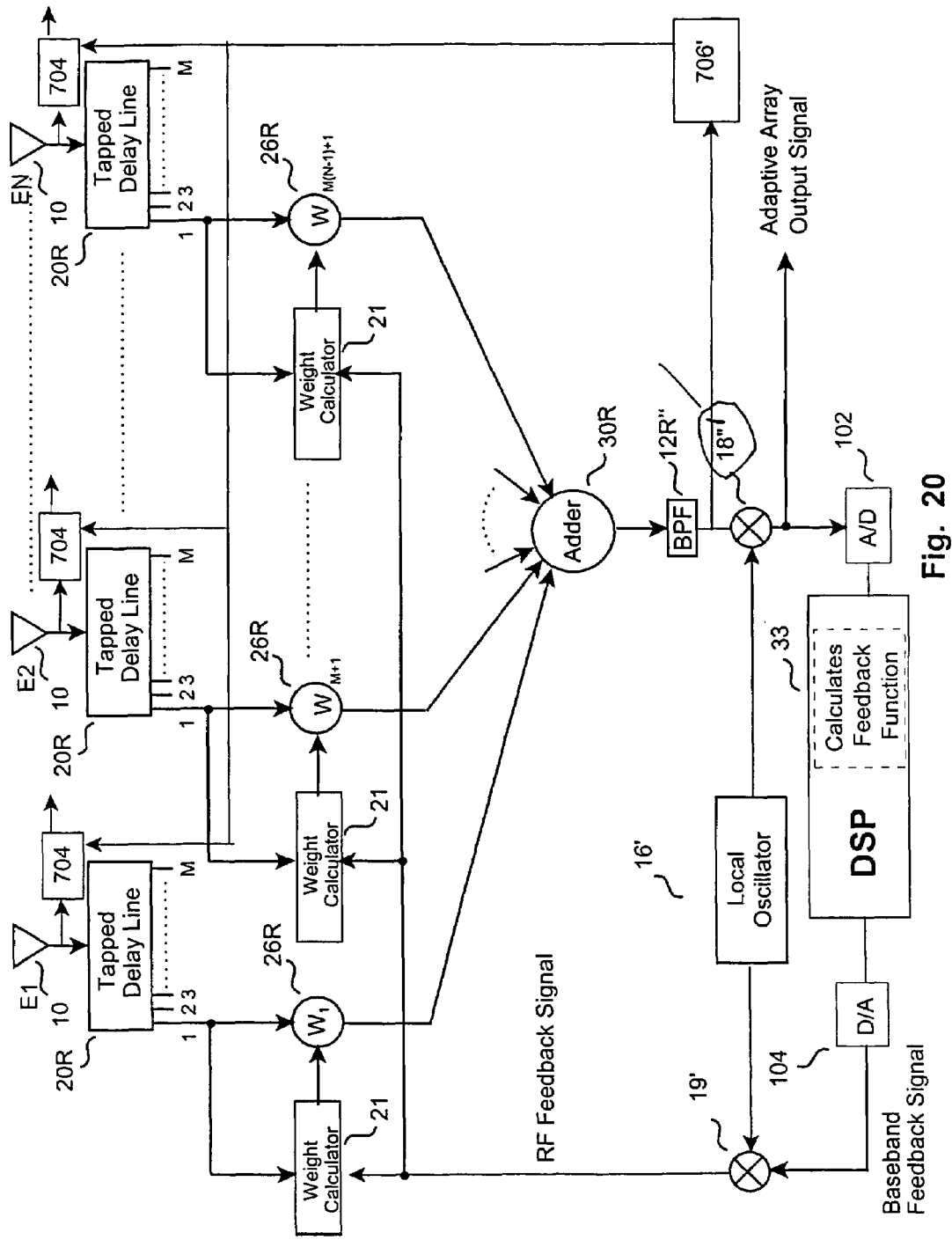
FIG. 20 shows a block diagram of a one-tuner smart antenna with a DSP at baseband and with a non-capture detector measuring the selected channel/desired signal input power for each antenna element of the present invention.

FIG. 20 shows another one-tuner smart antenna with the non-capture detector embodiment of the present invention. The signals over the full frequency band of the N antennas elements contain the desired signal and other signals in the selected channel bandpass, adjacent channels and adjacent bands. The output terminal of each antenna element 10 is coupled to the input terminal of the associated tapped delay line 20R and the first input terminal of the associated non capture detector 704. Each tapped delay line 20R generates M time shifted signals of the associated antenna signal. Each output terminal of each tapped delay line 20R is coupled to the first input terminal of the associated weight calculator 21 and first input terminal of associated weight 26R. The weight calculators 21 generate the weighting signals. The output terminal of each calculator weight 21 is coupled to the second input terminal of the associated weight 26R to weight the associated output antenna signal from the tapped delay line 20R. The output terminal of each weight 26R is coupled to an associated input terminal of adder 30R to sum all the weighted signals. The output terminal of adder 30R is coupled to the input terminal of bandpass filter 12R" which has the bandpass of the selected channel. The output terminal of bandpass filter 12R" is coupled to the first input terminal of downconverter 18''', which downconverts the signal to baseband, and the input terminal of limiting function 706'. The output terminal of downconverter 18''' is coupled the input terminal of analog to digital converter (A/D) 102. The output port of A/D 102 is coupled to the input port of digital signal processing device (DSP) 33 for implementing the feedback function portion and/or other segments of the smart antenna algorithm and generates the baseband feedback signal. The output port of DSP 33 is coupled to the input port of digital to analog converter (D/A) 104. The output terminal of D/A 104 is coupled to the first input terminal of first upconverter 19', which converts the baseband feedback signal to the RF frequency of the selected channel. The output terminals of local oscillator 16' is couple to the second input terminal of upconverter 19' and downconverter 18'''. The output terminal of upconverter 19' is coupled to the input terminal of each weight calculator 21. The output terminal of limiting function 706' is coupled to the second input terminal of each non-capture detector 704. Limiting functions and non capture detectors are discussed above.

FIG. 20 functions as a one-tuner smart antenna with non-capture detectors 704. The antenna signals are weighted and summed and bandpass filtered with bandpass filter 12R". The output signal from bandpass filter 12R" has the bandpass of the selected channel and is downconverted to baseband and digitized. The DSP implements the feedback function and other appropriate aspects of the smart antenna algorithm to generate the baseband feedback signal. Upconverter 19' upconverts the baseband feedback signal to the RF frequency of the selected channel. The output of each antenna element is coupled to the associated non-capture detector 704 to detect the power level of the selected channel at the start of adaptation and the desired signal power level at the end of adaptation of the smart antenna. The non-capture detectors ignores the signals in the adjacent channels and adjacent bands.

Prior art upconverters generate sum and difference signals from their two input signals (local oscillator signal and signal being upconverted). The sum signal or the difference signal is selected to be the upconverted signal and the other is generally filtered out (design dependent).

Figure 21:
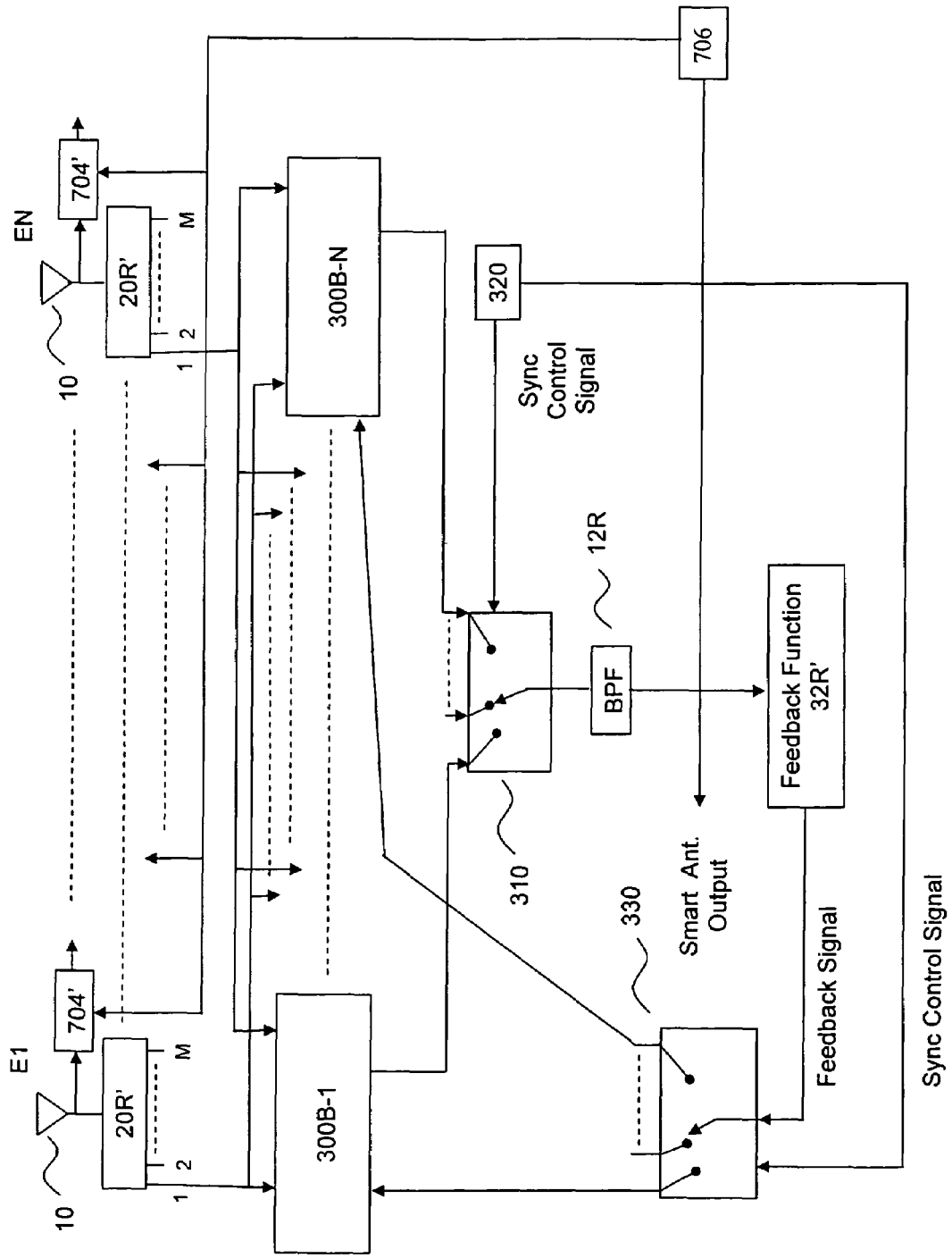
FIG. 21 shows a block diagram of time division multiple signal one-tuner smart antenna with non-capture detector for each antenna element of the present invention.

FIG. 21 shows another one-tuner smart antenna with the non-capture detector of the present invention. In FIG. 21, the one-tuner smart antenna receives signals from N transmitters, each with a different time slot. The received signals over the full frequency band of the N antennas elements contain the desired signal, other signals in the selected channel bandpass, and signals in adjacent channels and adjacent bands. The output terminal of each antenna element 10 is coupled to the input terminal of the associated tapped delay line 20R and the first input terminal of the associated non capture detector 704'. Each tapped delay line 20R generates M time shifted signals of the associated antenna signal. Each output terminal of each tapped delay line 20R is coupled to the first input terminal of the associated weight calculator 21 and first input terminal of associated weight 26R of each of the one-tuner smart antenna blocks 300B, shown in FIG. 22. Each of the N one-tuner smart antenna blocks 300B is assigned a transmitter and associated time slot.

Figure 22:
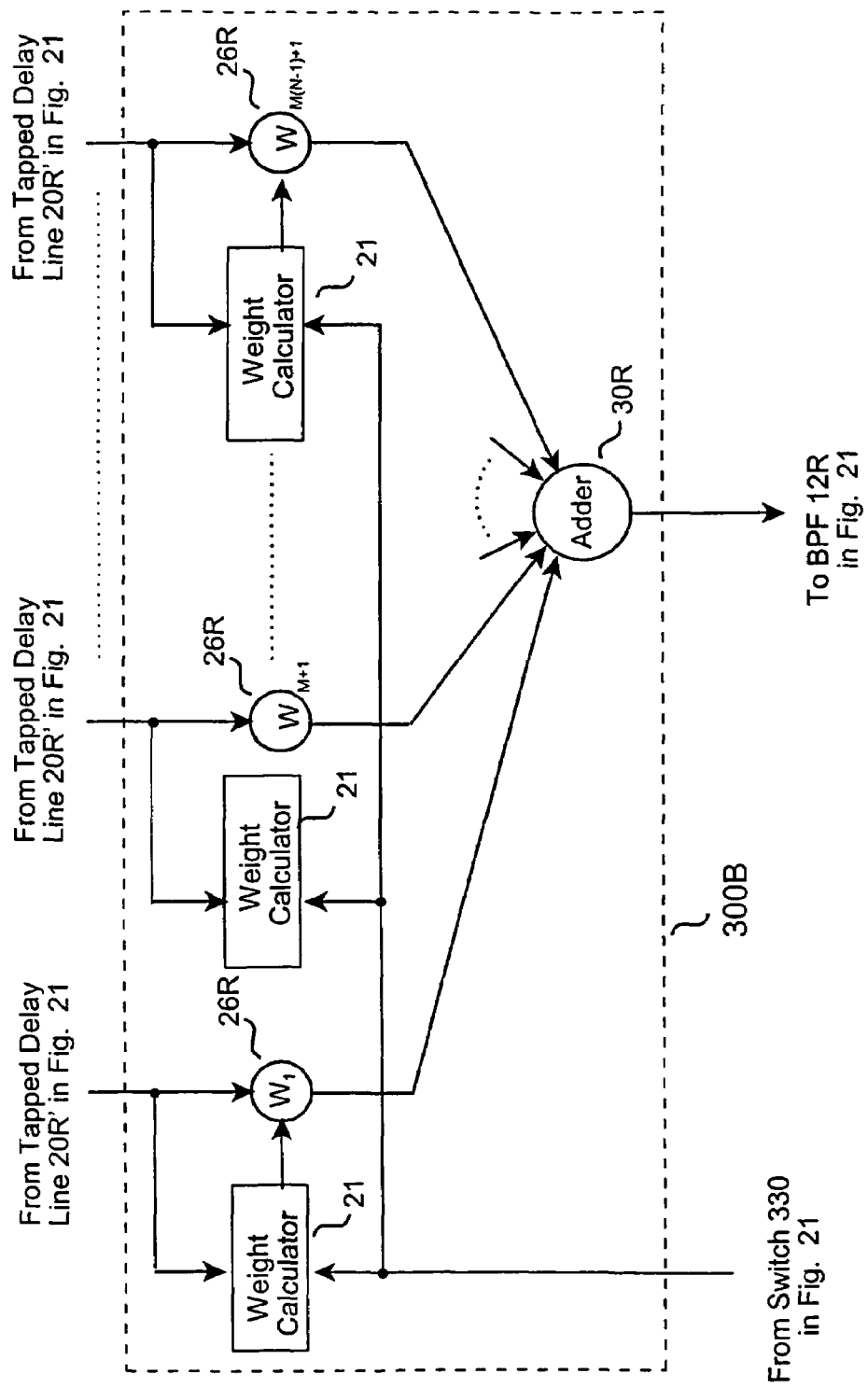
FIG. 22 shows a block diagram of the single user smart antenna block 300B in FIG. 21.

For each of the one-tuner smart antenna blocks 300B in FIG. 22, the associated weight calculators 21 generate the weighting signals. The output terminal of each calculator weight 21 is coupled to the second input terminal of the associated weight 26R to weight the associated output antenna signal from the associated tapped delay line 20R. The output terminal of each weight 26R is coupled to an associated input terminal of associated adder 30R to sum all the weighted signals in that one-tuner smart antenna block 300B. The output terminal of adder 30R of each one-tuner smart antenna block 300B is coupled to the associated input terminal of switch 310 for that one-tuner smart antenna block 300B in FIG. 21.

In FIG. 21, switch 310 is an N position switch synchronized to the one-tuner smart antenna blocks 300B associated time slots and associated received transmitter signals. The output terminal of switch 310 is coupled to the input terminal of bandpass filter 12R. The one bandpass filter 12R is shared by all of the one-tuner smart antenna blocks 300B and all the antennas. The output signal of bandpass filter 12R has the bandpass of the selected channel. The output terminal of bandpass filter 12R is coupled to the input terminal of feedback function 32R' and limiting function 706. The output terminal of feedback function 32R' is coupled to input terminal of switch 330. Switch 330 is an N position switch, one position for each one-tuner smart antenna block 300B, which is synchronized with switch 310 and the time slots of the associated one-tuner smart antenna blocks 300B. The feedback signal is coupled through switch 330 to the appropriate one-tuner smart antenna block 300B at the appropriate time slot. The first and second output terminals of synchronizer 320 are coupled the sync signal input terminals of switches 310 and 330 respectively. Synchronizer 320 syncs to the received signals time slots using methods well known in the art. The output terminal of limiting function 706 is coupled to the second input terminal of each non-capture detector 704'. Limiting functions and non-capture detectors are both discussed above.

In FIG. 21, each non-capture detector 704' delivers a different power level for each time slot and associated transmitter for the related channel at the beginning of adaptation and the desired signal after adaptation. Each one-tuner smart antenna block 300B adapts to reduce interference during its assigned time slot when the associated transmitter is transmitting.

Figure 15:
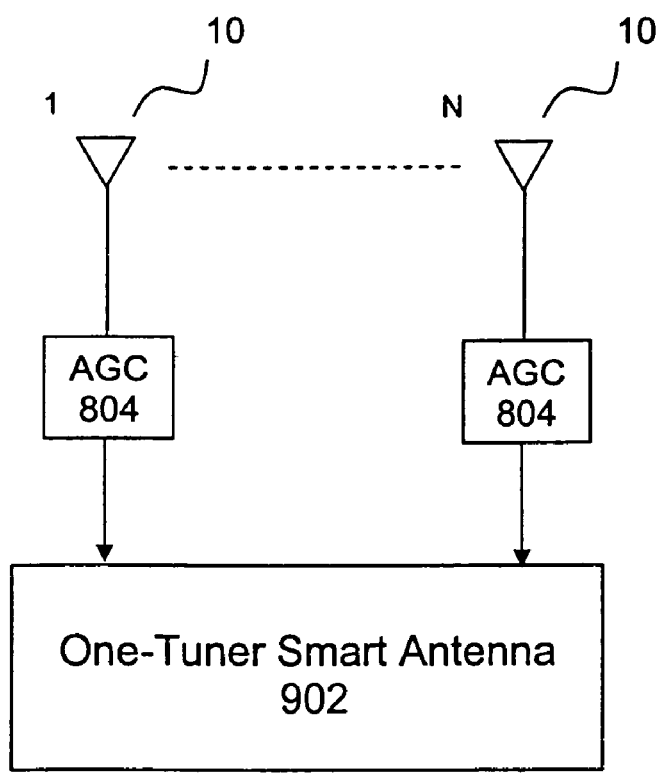
FIG. 15 shows a block diagram of the one-tuner smart antenna with AGC.

The automatic gain control (AGC) is used for purposes such as keeping signals within operating ranges. The AGC amplitude levels the signals. FIG. 15 shows one-tuner smart antenna 902 with standard AGCs 804. Each antenna 10 is coupled to the input terminal of associated AGC 804. The output terminal of each AGC 804 is coupled to the associated input terminal of one-tuner smart antenna 902. Adjacent channels/bands signals distort the AGC respond, and strong adjacent channels/bands signals can capture the AGCs 804, making the selected channel bandpass signals ineffective in controlling the AGC. This can affect the performance of the one-tuner smart antenna in a negative manner.

Figure 16:
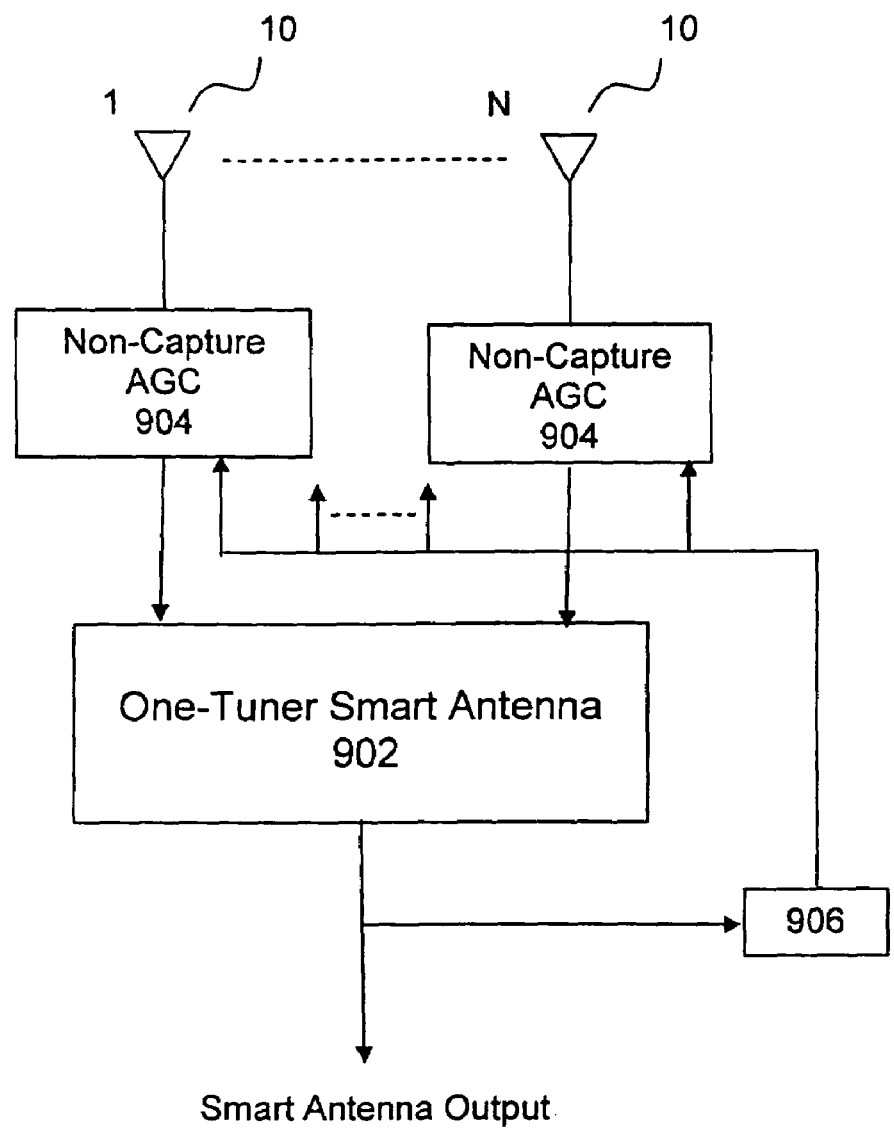
FIG. 16 shows a block diagram of the one-tuner smart antenna with non-capture AGC.

FIG. 16 shows another embodiment of the present invention for non-capture AGC 904 applied to a representation of the wideband antenna signals. Each antenna 10 is coupled to the first input terminal of the non-capture AGC 904. AGC 904 is discussed below. The output terminal of non-capture AGC 904 is coupled to the associated input terminal of one-tuner smart antenna 902. The output terminal of one-tuner smart antenna 902 is coupled to the input terminal of limiting function 906. Limiting function 906 is similar to limiting function 506 discussed above. The output signal of limiting function 906 has the bandpass of the selected channel bandpass and is coupled to the second input terminal of each non-capture AGC 904.

Figure 17A:
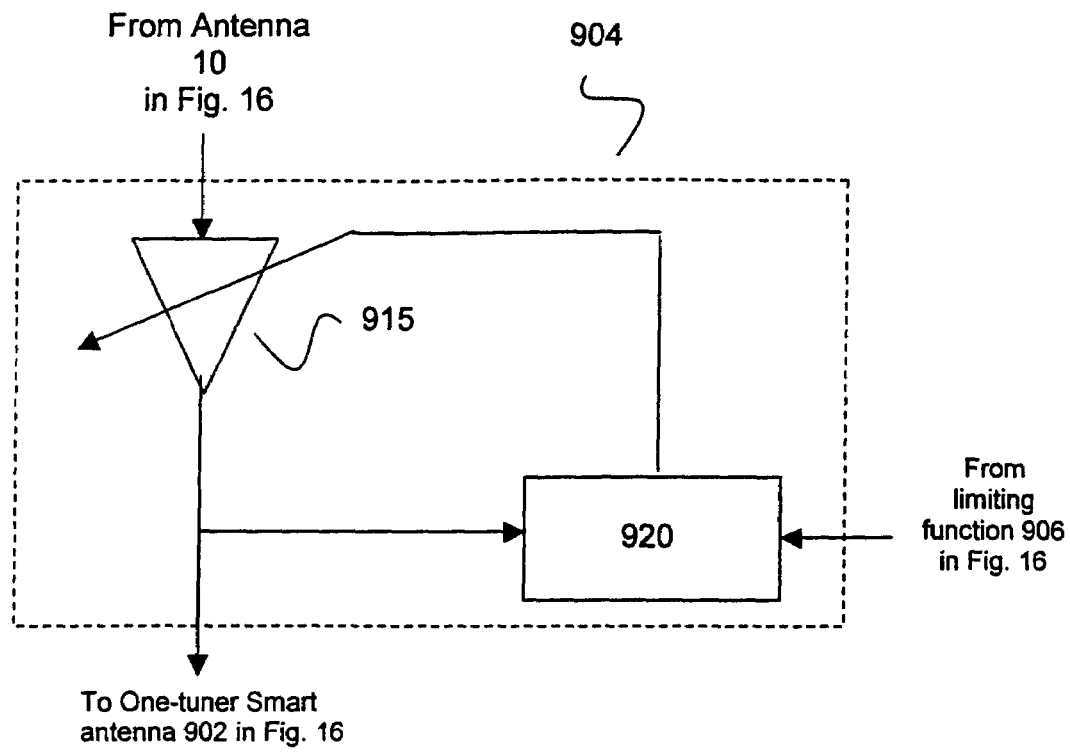
FIG. 17A shows a block diagram of the non-capture feedback AGC of FIG. 16.

FIG. 17A shows an embodiment of non-capture AGC 904 of FIG. 16 for a feedback AGC. The antenna 10 in FIG. 16 is coupled to the first input terminal of variable amplifier 915. The output terminal of variable amplifier 915 is coupled to the associated input terminal of one-tuner smart antenna 902 and the first input terminal of non-capture detector 920. The non-capture detector is discussed above. The output terminal of limiting function 906 in FIG. 16 is coupled to the second input terminal of non-capture detector 920, where the output signal of limiting function 906 has the bandpass of the selected channel. The output signal of non-capture detector 920 responds only to the frequency components of the wideband antenna signal that are in the selected channel bandpass, and it generates the control signal for variable amplifier 915 and is coupled to the control input terminal of variable amplifier 915. AGC 904 is not affected by the signals in adjacent channels/bands, because non-capture detector 920 is not affected by them.

Since non-capture AGC 904 correlates the wideband antenna signal with the output signal of limiting function 906 which has the bandpass of the selected channel, the adjacent channels/bands signals are uncorrelated with the output signal of limiting function 906 and do not contribute to the correlator output or the control signal of non-capture AGC 904. The frequency components of the wideband antenna signal in the selected channel bandpass does have correlated components and contributes to the correlator output of non-capture detector 920 and the control of AGC 904. Consequently only the signals in the selected channel bandpass control non-capture AGC 904 and the adjacent channels/bands signals are ignored.

If a convergence of the smart antenna is slower than AGC 904 convergence, AGC 904 is controlled by the power level of all the signals in the selected channel. Then after convergence of the smart antenna, AGC 904 is controlled by the power level of the desired signal. If AGC 904 convergence is slower than the convergence of the smart antenna, AGC 904 is controlled by the power level of the desired signal.

Figure 17B:
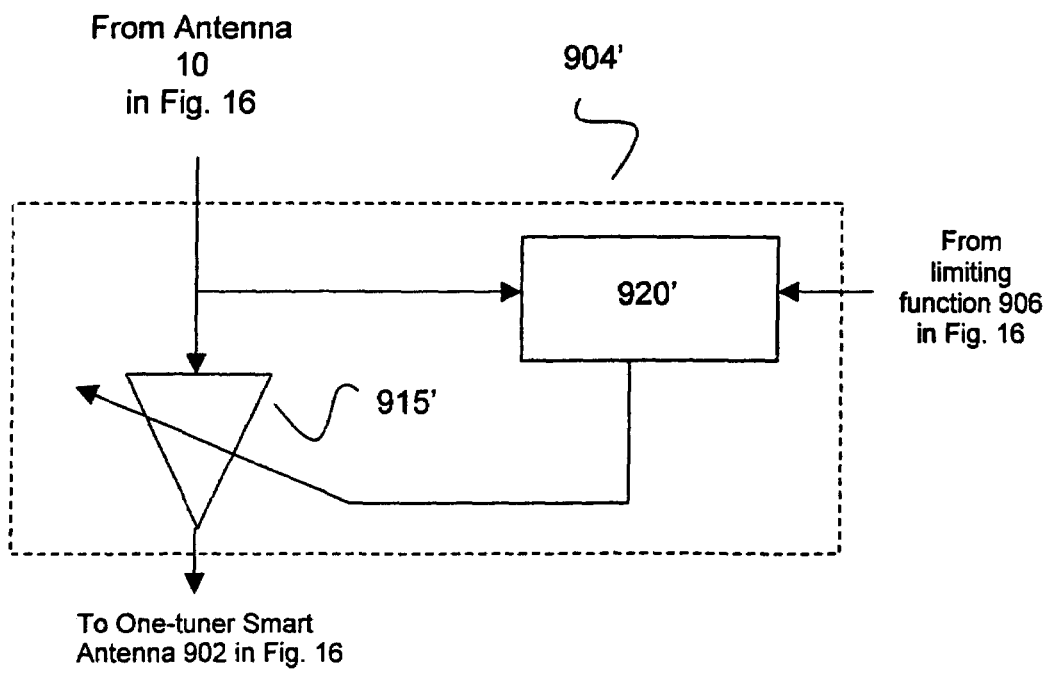
FIG. 17B shows a block diagram of the non-capture feed forward AGC of FIG. 16.

The correlator output or the control signal of non-capture AGC 904'. The frequency components of the wideband antenna signal in the selected channel bandpass does have correlated components and contributes to the correlator output of non-capture detector 920' and the control of non-capture AGC 904'. Consequently only the signals in the selected channel bandpass control non-capture AGC 904' and the adjacent channels/bands signals a FIG. 17B shows an embodiment of non-capture AGC 904 of FIG. 16 for a feed forward AGC. The feed forward AGC 904 is called non-capture AGC 904' for clarity. The antenna 10 in FIG. 16 is coupled to the first input terminal of variable amplifier 915' and first input terminal of non-capture detector 920'. The non-capture detector is discussed above. The output terminal of limiting function 906 in FIG. 16 is coupled to the second input terminal of non-capture detector 920', where the output signal of limiting function 906 has the bandpass of the selected channel. The output signal of non-capture detector 920' responds only to the frequency components of the wideband antenna signal that are in the selected channel bandpass, Non-capture detector 920' generates the control signal for variable amplifier 915'. The output terminal of and non-capture detector 920' is coupled to the control input terminal of variable amplifier 915'. The output terminal of variable amplifier 915' is coupled to the associated input terminal of one-tuner smart antenna 902 in FIG. 16. Non-capture AGC 904' is not affected by the signals in adjacent channels/bands, because non-capture detector 920' is not affected by them.

The one-tuner smart antenna 902 adapts and generates a one-tuner smart antenna output signal with reduced interference in the selected channel bandpass and enhance reception of the desired signal. Each one of the wideband input signals are applied to the first input of an associated separate non-capture detector 920' with the one-tuner smart antenna output signal as the second input signal to each said non-capture detector 920' to generate a separate non-capture detected output signal for each wideband input signal. The power level of each wideband input signal is adjusted to generate amplitude leveled signals in the selected channel bandpass. The level adjustment is made with the non-capture detector 920' in a feed forward manner.

Since the non-capture AGC 904' correlates the wideband antenna signal with the output signal of limiting function 906 which has the bandpass of the selected channel, the adjacent channels/bands signals are uncorrelated with the output signal of limiting function 906 and do not contribute to re ignored.

The non-capture AGC 904 can be used in other communications signal flow configurations where a bandpass filter which normally rejects an interference signal outside the selected channel bandpass is removed and a version of the selected channel bandpass signal is available (i.e. single input adaptive filter). This is a new invention.

This is only one embodiment of the non-capture AGC of the present invention. It would be obvious to a person skilled in the art that other embodiments are possible.

It would be clear to a person skilled in the art that the various embodiments of the present invention can be implemented in either analog, digital, analog/digital hybrid, etc., also as partially illustrated below.

Figure 8:
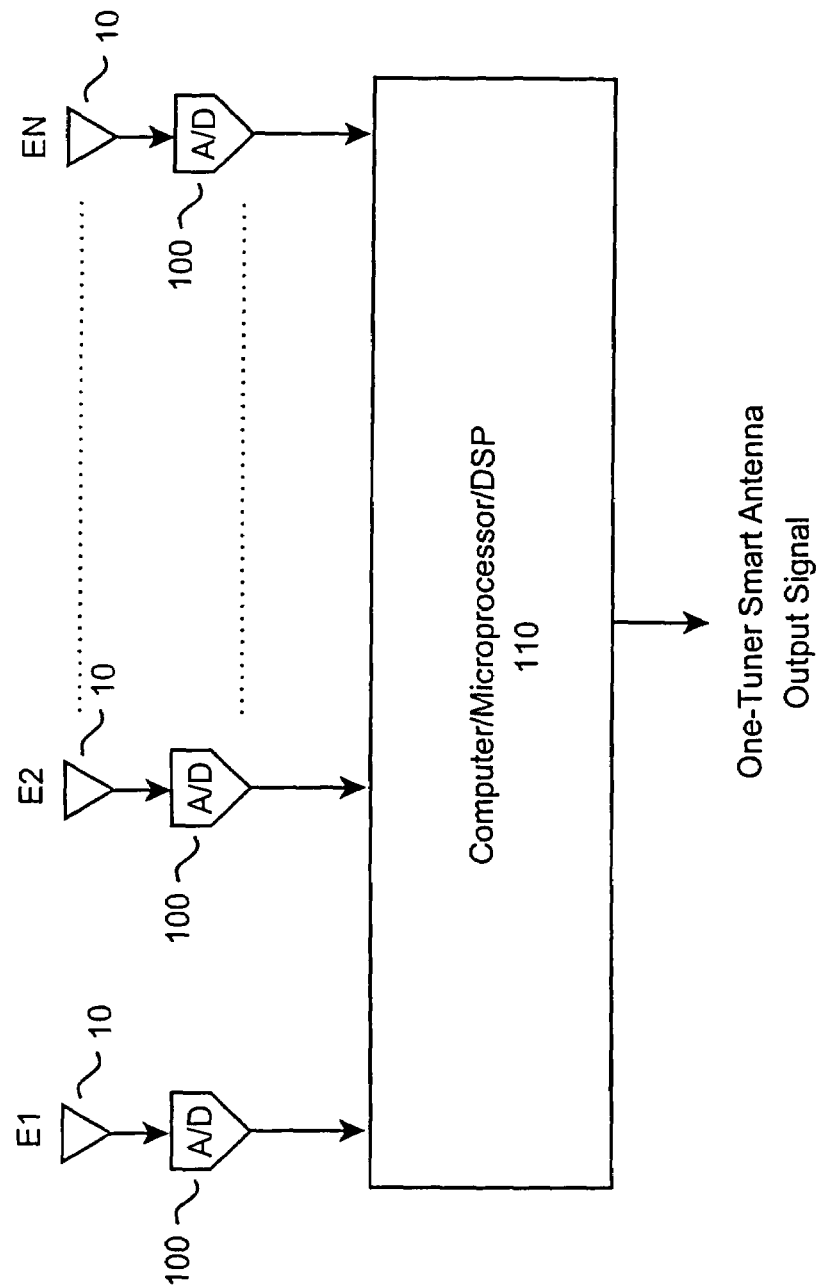
FIG. 8 shows block diagram of a computer/DSP/microprocessor implementation of the present invention.

FIG. 8 shows the present invention implemented with the use of a computer, microprocessor, or digital signal processor (DSP) 110. The radio signals are received by antennas 10, with each antenna 10 coupled to the input terminal of an associated analog-to-digital (A/D) converter 100. The output port of each A/D converter 100 is coupled to the associated input port of computer/microprocessor/DSP 110. The smart antenna algorithm for a specific embodiment of the present invention is implemented in the computer/microprocessor/DSP 110. There are many software embodiments possible for one-tuner smart antennas of the present invention.

Figure 18:
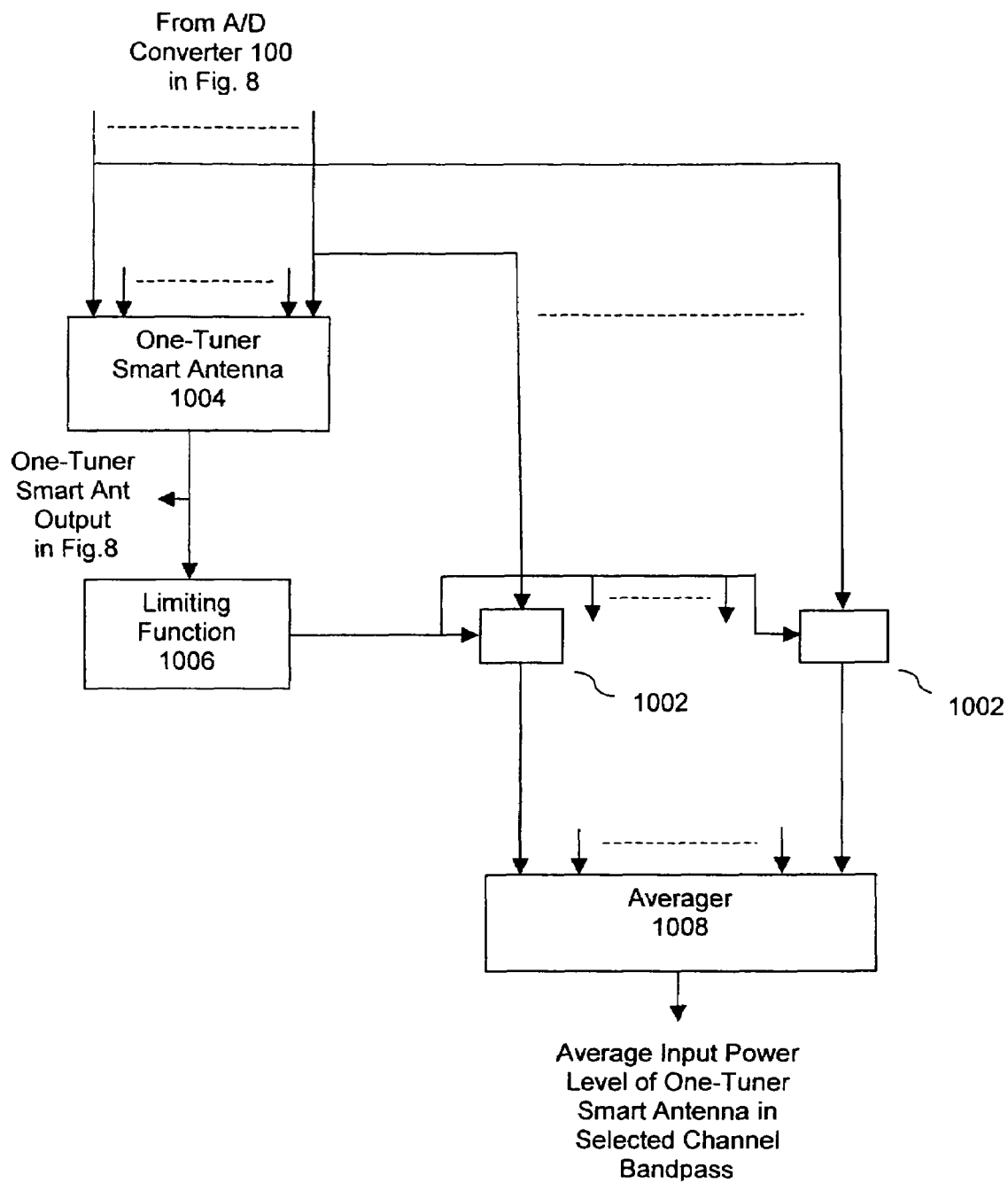
FIG. 18 shows a block diagram of a digital implementation of the one-tuner smart antenna with non-capture detectors of FIG. 8.

FIG. 18 shows one software embodiment of the present invention. The output of each A/D converters 100 in FIG. 8 are received by the associated non-capture detector 1002 and associated input of one-tuner smart antenna 1004. The power level of each antenna input signal in the selected channel bandpass or the desired signal power level is detected by the associated non-capture detector in non-capture detector 1002 (as discussed above). Non-capture detectors are discussed above. A representation of the input power level of the selected channel bandpass or desired signal of each antenna is received by averager 1008. Averager 1008 averages the power levels from all the antennas. The output from averager 1008 is the average input power level to the one-tuner smart antenna 1004 in the selected channel bandpass or desired signal. One-tuner smart antenna 1004 uses an algorithm representation of the one-tuner smart antenna and reduces interference in the selected channel bandpass, optimizing reception of the desired signal. The one-tuner smart antenna is discussed above. The smart antenna output is received by limiting function 1006. Limiting functions are discussed above. The output of limiting function 1006 is coupled to the input of each non-capture detector 1002. The one-tuner smart antenna in FIG. 18 ignores adjacent channels/bands signals and reduces interference in the selected channel bandpass to improve reception of the desired signal, and it detects the average level of the antenna input power level (or desired signal components power level) for the one-tuner smart antenna in the selected channel bandpass without being captured or being distorted by the adjacent channels/bands signals.

The software embodiment in FIG. 18 is one software embodiment of the present invention. It would be clear to a person skilled in the art that other software embodiments are possible.

From the foregoing description, it will be apparent that the invention disclosed herein provides novel and advantageous implementations and performance improvements for one tuner smart antenna. It will be understood by those familiar with the art, the invention may be embodied in other specific forms without departing from the spirit or essential characteristics thereof.

What is claimed is:

1. A method for reducing distortion of an input power level determination of signals in a selected channel of at least one of the wideband input signals of a smart antenna allowing signals outside said selected channel to be received by said smart antenna where said smart antenna reduces interference in only said selected channel and includes processing a desired signal, said method including the steps of:
   a. adapting said smart antenna using a representation of said wideband input signals including signals in said selected channel and at least one signal outside said selected channel that generates a smart antenna output signal in said selected channel including said desired signal with said smart antenna reducing interference only in said selected channel;
   b. correlating a representation of at least one of said wideband input signals with a representation of said smart antenna output signal generated in step a. that separately generates a correlator output signal for each associated one of said wideband input signals; and
   c. detecting the signal level of at least one said correlator output signal generated in step b. that separately generates a representation of said input power level of signals in said selected channel of each associated one of said wideband input signals.

2. A method for reducing distortion of a determination of an input power level of signals in a selected channel including a desired signal of at least one of the wideband input signals of a one-tuner smart antenna caused by signals outside said selected channel where said one-tuner smart antenna reduces interference in said selected channel of said desired signal, where a plurality of antennas generate said wideband input signals, and where each one of said wideband input signals is coupled to an associated input of said one-tuner smart antenna, said method including the steps of:
   a. adapting said one-tuner smart antenna using a representation of said wideband input signals including signals in said selected channel and at least one signal outside said selected channel that generates a one-tuner smart antenna output signal in said selected channel including said desired signal with said one-tuner smart antenna reducing interference only in said selected channel;
   b. separately correlating a representation of at least one of said wideband input signals with a representation of said one-tuner smart antenna output signal generated in step a. that generates a correlator output signal for each associated one of said wideband input signals; and
   c. detecting a power level of each said correlator output signal generated in step b. that generates a representation of said input power level of signals in said selected channel of each associated one of said wideband input signals.

3. The method as in claim 2 wherein:
   step b. further includes the step of:
   d. applying a limiting function to said one-tuner smart antenna output signal generated in step a. before correlation.

4. The method as in claim 3 wherein said one-tuner smart antenna further includes a DSP at baseband to perform at least part of the calculation of an algorithm of said one-tuner smart antenna.

5. The method as in claim 3:
   further includes a time division multiuser one-tuner smart antenna for reducing interference in said selected channel of said desired signal of a multiuser receiver for a time division communications system, where said time division multiuser one-tuner smart antenna is made up of a separate one-tuner smart antenna for each one of the users of said multiuser receiver with each one of said wideband input signals coupled to separate weights, weight calculators and summer for the associated time slot;
   step a. includes the steps of:
   e. separately weighting said wideband input signals for associated one of said users with associated said weights to generate separate weighted wideband signals in the associated time slot;
   f. summing associated said weighted wideband signals generated in step e. to generate a wideband summed signal for associated one of said users in said associated time slot;

g. selecting said wideband summed signal for associated time slot generated in step f. to generate a selected summed signal;

h. bandpass filtering over the selected channel bandpass of said selected summed signal generated in step g. to generate a bandpass filtered output signal in the bandpass of said selected channel for associated one of said users;

i. processing said bandpass filtered output signal generated in step h. with said feedback function to generate a feedback signal for associated one of said users;

j. coupling said feedback signal generated in step i. to inputs of associated weight calculators of said one-tuner smart antenna of associated one of said users and associated time slot;

k. individually correlating each one of said wideband input signals with said feedback signal generated in step j. with associated weight calculators to generate a separate weight value for each associated one of said weights for associated one of said users;

l. adapting associated said weights to reduce interference in associated wideband summed signal generated in step e. for said user in said selected channel; and m. repeating steps e. through l. for each user when assigned time slot occurs;

step b. further includes the step of:

n. repeating step b. for each said assigned time slot; and step c. further includes the step of:

o. repeating step c. for each said assigned time slot.

6. The method as in claim 2 wherein step c. further includes the step of:

d. selecting said representation of said input power level generated in step c. at the beginning of adaptation of said one-tuner smart antenna before said interference signals are reduced and hold the same value over the length of said adaptation to generate said input power level of all signals in said selected channel.

7. The method as in claim 2 wherein step c. further includes the step of:

d. selecting said representation of said input power level generated in step c. at the end of adaptation of said one-tuner smart antenna after said interference signals are reduced and hold the same value over the duration of next adaptation to generate said input power level of said desired signal.

8. A method for reducing distortion of AGC for signals in a selected channel including a desired signal of the wideband input signals of a one-tuner smart antenna caused by signals outside said selected channel, where said one-tuner smart antenna reduces interference in the selected channel of the desired signal, where at least one signal outside said selected channel is present and where said one-tuner smart antenna has a plurality of antennas that provide said wideband input signals, said method including the steps of:

a. adjusting a power level of a representation of each one of said wideband input signals that generates amplitude leveled signals in said selected channel;

b. adapting said one-tuner smart antenna using a representation of each one of said amplitude leveled signals generated in step a. that generates a one-tuner smart antenna output signal including said desired signal in said selected channel;

c. applying a representation of each one of said amplitude leveled signals generated in step a. as a first input signal to a separate non-capture detector with a representation of said one-tuner smart antenna output signal generated in step b. as second input signal to each said non-capture detector that generates a separate non-capture detector output signal for each one of said amplitude leveled signals; and d. controlling said power level adjustment in step a. with associated said non-capture detector output signal generated in step c. in a feedback manner for each one of said wideband input signals to amplitude level said signals in said selected channel.

9. A method for reducing distortion of AGC for signals in a selected channel including a desired signal of the wideband input signals of a one-tuner smart antenna caused by signals outside said selected channel, where said one-tuner smart antenna reduces interference in said selected channel of said desired signal, where at least one signal outside said selected channel is present and where said one-tuner smart antenna has a plurality of antennas that provide said wideband input signals, said method including the steps of:

a. adapting said one-tuner smart antenna that generates a one-tuner smart antenna output signal including said desired signal in said selected channel;

b. applying a representation of each one of said wideband input signals as a first input signal to a separate non-capture detector with a representation of said one-tuner smart antenna output signal generated in step a. as a second input signal to each said non-capture detector that generates a separate non-capture detector output signal for each one of said wideband input signals;

c. separately adjusting a power level of each one of said wideband input signals that amplitude levels said signals in said selected channel for input to said one-tuner smart antenna; and d. controlling the power level adjustment in step c. with associated non-capture detector output signal generated in step b. in a feed forward manner.

10. A method for reducing gain distortion of input antenna branch limiters for signals in a selected channel of the wideband input signals including a desired signal for weight calculations of a one-tuner smart antenna caused by signals outside said selected channel where said one-tuner smart antenna reduces interference in said selected channel of the desired signal, where at least one signal outside said selected channel is present and where said one-tuner smart antenna has a plurality of antennas that provide wideband input signals, each one of said wideband input signals is coupled to associated input of said one-tuner smart antenna, said method including the steps of:

a. adjusting a signal power level of a representation of each one of said wideband input signals that generates an amplitude limited output signal with constant power level of said signals in said selected channel;

b. adapting said one-tuner smart antenna by using said amplitude limited output signals generated in step a. for said weight calculations that generates a one-tuner smart antenna output signal in said selected channel including said desired signal;

c. correlating a representation of said one-tuner smart antenna output signal generated in step b. with a representation of associated one of said wideband input signals for each one of said input antenna branch limiters that generates a separate correlator output signal for each one of said input antenna branch limiters;

d. separately scaling a power level of each said correlator output signal generated in step c. that generates a limiter control signal; and e. controlling said adjustment of said signal power level in step a. with associated limiter control signal generated in step d. to keep said power level of associated said amplitude limited output signal generated in step a. constant.

11. The method as in claim 10, wherein:

step c. further includes the step of:

f. applying a limiting function to said one-tuner smart antenna output signal generated in step b. before correlation.

12. The method as in claim 10, wherein step e. further includes the step of:

f. selecting said limiter control signal generated in step d. at the beginning of adaptation of said one-tuner smart antenna before said interference signals are reduced and hold the same value of said limiter control signal over the length of said adaptation.

13. The method as in claim 10 wherein step e. further includes the step of:

f. selecting said limiter control signal generated in step d. at the end of adaptation of said one-tuner smart antenna after said interference signals are reduced and hold value of said limiter control signal over the duration of next adaptation.

\* \* \* \* \*